US009952942B2

(12) United States Patent
Gunsolley et al.

(10) Patent No.: US 9,952,942 B2
(45) Date of Patent: Apr. 24, 2018

(54) SYSTEM FOR DISTRIBUTED DATA PROCESSING WITH AUTO-RECOVERY

(71) Applicant: Bank of America Corporation, Charlotte, NC (US)

(72) Inventors: Shawn Cart Gunsolley, Charlotte, NC (US); Erin Cassell, Charlotte, NC (US); Siva Shankar Potla, Charlotte, NC (US); Adam Nathaniel Desautels, Charlotte, NC (US); Jeffrey Scott Poore, Fort Mill, SC (US); Marshall Bright Thompson, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 62 days.

(21) Appl. No.: 15/042,290

(22) Filed: Feb. 12, 2016

(65) Prior Publication Data
US 2017/0235610 A1 Aug. 17, 2017

(51) Int. Cl.
G06F 11/00 (2006.01)
G06F 11/14 (2006.01)
(Continued)

(52) U.S. Cl.
CPC .......... G06F 11/1471 (2013.01); G06F 9/461 (2013.01); G06F 9/5027 (2013.01);
(Continued)

(58) Field of Classification Search
CPC ............. G06F 11/1471; G06F 11/0709; G06F 11/1446; G06F 11/1458; G06F 11/3006;
(Continued)

(56) References Cited

U.S. PATENT DOCUMENTS 3,555,349 A 1/1971 Munz
3,555,988 A 1/1971 Wagner
(Continued)

FOREIGN PATENT DOCUMENTS

CN 1492338 A 4/2004
CN 1885341 A 12/2006
(Continued)

OTHER PUBLICATIONS

Canadian Office Action dated Oct. 30, 2012 for Application No. 2,546,849.
(Continued)

Primary Examiner — Joseph D Manoskey
(74) Attorney, Agent, or Firm — Michael A. Springs; Moore & Van Allen PLLC; Patrick B. Horne

(57) ABSTRACT

Embodiments enable distributed data processing with automatic caching at multiple system levels by accessing a master queue of data processing work comprising a plurality of data processing jobs stored in a long term memory cache; selecting at least one of the plurality of data processing jobs from the master queue of data processing work; pushing the selected data processing jobs to an interface layer including (i) accessing the selected data processing jobs from the long term memory cache; and (ii) saving the selected data processing jobs in an interface layer cache of data processing work; and pushing at least a portion of the selected data processing jobs to a memory cache of a first user system for minimizing latency in user data processing of the pushed data processing jobs.

14 Claims, 16 Drawing Sheets

(51) Int. Cl.
  *G06F 9/50* (2006.01)
  *G06F 9/52* (2006.01)
  *G06F 9/46* (2006.01)
  *G06F 11/07* (2006.01)

(52) U.S. Cl.
  CPC .............. *G06F 9/5044* (2013.01); *G06F 9/52* (2013.01); *G06F 11/0709* (2013.01); *G06F 11/1458* (2013.01); *G06F 2201/805* (2013.01); *G06F 2201/85* (2013.01)

(58) Field of Classification Search
  CPC ...... G06F 9/5027; G06F 9/461; G06F 9/5044; G06F 9/52; G06F 2201/805; G06F 2201/85
  USPC .............................................. 714/15, 20, 16
  See application file for complete search history.

(56) References Cited

U.S. PATENT DOCUMENTS

| | | |
|---|---|---|
| 3,556,050 A | 1/1971 | Trachtenberg et al. |
| 3,558,810 A | 1/1971 | Cecchin |
| 3,560,739 A | 2/1971 | Wolff |
| 3,561,432 A | 2/1971 | Yamaki et al. |
| 3,564,133 A | 2/1971 | Hobrough |
| 3,564,266 A | 2/1971 | Klotz, Jr. |
| 3,566,139 A | 2/1971 | Hardy et al. |
| 3,567,856 A | 3/1971 | Nezu |
| 3,571,527 A | 3/1971 | Becker et al. |
| 3,572,924 A | 3/1971 | Matsumoto et al. |
| 3,576,392 A | 4/1971 | Hofstein |
| 3,576,999 A | 5/1971 | Blythe et al. |
| 3,578,857 A | 5/1971 | Busch |
| 3,584,148 A | 6/1971 | Flory |
| 3,584,931 A | 6/1971 | Daring |
| 3,585,283 A | 6/1971 | Graser, Jr. |
| 3,586,765 A | 6/1971 | Jirka |
| 3,592,535 A | 7/1971 | Gerry |
| 3,592,548 A | 7/1971 | Majkowski |
| 3,614,309 A | 10/1971 | Presti |
| 3,614,764 A | 10/1971 | Kolb et al. |
| 3,615,540 A | 10/1971 | Land et al. |
| 3,619,052 A | 11/1971 | Diachuk et al. |
| 3,619,060 A | 11/1971 | Johnson |
| 3,620,729 A | 11/1971 | Ray-Chaudhuri et al. |
| 3,622,224 A | 11/1971 | Wysocki et al. |
| 3,627,918 A | 12/1971 | Redpath |
| 3,630,623 A | 12/1971 | Schirmer |
| 3,632,181 A | 1/1972 | Lee |
| 3,635,139 A | 1/1972 | Guite, Sr. |
| 3,636,845 A | 1/1972 | Harvey |
| 3,643,017 A | 2/1972 | Pekau |
| 3,643,019 A | 2/1972 | Beltz |
| 3,646,256 A | 2/1972 | Jacob et al. |
| 3,647,289 A | 3/1972 | Weber |
| 3,647,290 A | 3/1972 | Egnaczak et al. |
| 3,647,441 A | 3/1972 | Bachelder |
| 3,648,388 A | 3/1972 | Lowell et al. |
| 3,648,584 A | 3/1972 | Eacock |
| 3,652,164 A | 3/1972 | Faramarzpour et al. |
| 3,654,707 A | 4/1972 | Roberts |
| 3,656,427 A | 4/1972 | Foley |
| 3,659,159 A | 4/1972 | Nagata |
| 3,661,457 A | 5/1972 | Frech |
| 3,661,577 A | 5/1972 | Klemm et al. |
| 3,737,628 A | 6/1973 | Azure, Jr. |
| 3,778,595 A | 12/1973 | Hatanaka et al. |
| 4,417,136 A | 11/1983 | Rushby et al. |
| 4,523,330 A | 6/1985 | Cain |
| 4,555,617 A | 11/1985 | Brooks et al. |
| 5,007,100 A | 4/1991 | D'Aoust et al. |
| 5,182,656 A | 1/1993 | Chevion et al. |
| 5,257,328 A | 10/1993 | Shimizu |
| 5,359,667 A | 10/1994 | Borowski et al. |
| 5,453,601 A | 9/1995 | Rosen |
| 5,600,574 A | 2/1997 | Reitan |
| 5,631,984 A | 5/1997 | Graf et al. |
| 5,678,046 A | 10/1997 | Cahill et al. |
| 5,679,940 A | 10/1997 | Templeton et al. |
| 5,687,250 A | 11/1997 | Curley et al. |
| 5,740,271 A | 4/1998 | Kunkler et al. |
| 5,754,673 A | 5/1998 | Brooks et al. |
| 5,774,249 A | 6/1998 | Shiraishi et al. |
| 5,848,400 A | 12/1998 | Chang |
| 5,917,965 A | 6/1999 | Cahill et al. |
| 5,940,844 A | 8/1999 | Cahill et al. |
| 5,963,659 A | 10/1999 | Cahill et al. |
| 6,076,074 A | 6/2000 | Cotton et al. |
| 6,097,834 A | 8/2000 | Krouse et al. |
| 6,115,509 A | 9/2000 | Yeskel |
| 6,122,625 A | 9/2000 | Rosen |
| 6,181,814 B1 | 1/2001 | Carney |
| 6,181,837 B1 | 1/2001 | Cahill et al. |
| 6,351,553 B1 | 2/2002 | Hayosh |
| 6,574,377 B1 | 6/2003 | Cahill et al. |
| 6,658,393 B1 | 12/2003 | Basch et al. |
| 6,671,795 B1 | 12/2003 | Marr et al. |
| 6,697,512 B2 | 2/2004 | Simonoff |
| 6,845,366 B1 | 1/2005 | Hassanein et al. |
| 6,886,136 B1 | 4/2005 | Zlotnick et al. |
| 6,903,767 B2 | 6/2005 | Robins et al. |
| 6,913,260 B2 | 7/2005 | Maier et al. |
| 7,082,216 B2 | 7/2006 | Jones et al. |
| 7,092,560 B2 | 8/2006 | Jones et al. |
| 7,092,561 B2 | 8/2006 | Downs, Jr. |
| 7,103,438 B2 | 9/2006 | Hallowell et al. |
| 7,171,032 B2 | 1/2007 | Jones et al. |
| 7,181,430 B1 | 2/2007 | Buchanan et al. |
| 7,191,151 B1 | 3/2007 | Nosek |
| 7,191,657 B2 | 3/2007 | Maier et al. |
| 7,197,173 B2 | 3/2007 | Jones et al. |
| 7,201,320 B2 | 4/2007 | Csulits et al. |
| 7,209,571 B2 | 4/2007 | Davis et al. |
| 7,216,106 B1 | 5/2007 | Buchanan et al. |
| 7,232,024 B2 | 6/2007 | Mazur et al. |
| 7,362,891 B2 | 4/2008 | Jones et al. |
| 7,366,338 B2 | 4/2008 | Jones et al. |
| 7,376,603 B1 | 5/2008 | Mayr et al. |
| 7,386,511 B2 | 6/2008 | Buchanan et al. |
| 7,391,897 B2 | 6/2008 | Jones et al. |
| 7,436,979 B2 | 10/2008 | Bruce et al. |
| 7,440,924 B2 | 10/2008 | Buchanan et al. |
| 7,503,445 B2 | 3/2009 | Yoshioka |
| 7,505,831 B2 | 3/2009 | Jones et al. |
| 7,505,931 B2 | 3/2009 | Da Silva |
| 7,516,360 B2 * | 4/2009 | Bacher ................ G06F 11/2023 714/12 |
| 7,542,598 B2 | 6/2009 | Jones et al. |
| 7,590,274 B2 | 9/2009 | Raterman et al. |
| 7,591,428 B2 | 9/2009 | Freeman et al. |
| 7,599,543 B2 | 10/2009 | Jones et al. |
| 7,602,956 B2 | 10/2009 | Jones et al. |
| 7,619,721 B2 | 11/2009 | Jones et al. |
| 7,620,231 B2 | 11/2009 | Jones et al. |
| 7,624,071 B2 | 11/2009 | Buchanan et al. |
| 7,628,326 B2 | 12/2009 | Freeman et al. |
| 7,635,082 B2 | 12/2009 | Jones |
| 7,686,151 B2 | 3/2010 | Renz et al. |
| 7,702,588 B2 | 4/2010 | Gilder et al. |
| 7,729,990 B2 | 6/2010 | Marceau et al. |
| 7,735,621 B2 | 6/2010 | Hallowell et al. |
| 7,762,380 B2 | 7/2010 | Freeman et al. |
| 7,778,456 B2 | 8/2010 | Jones et al. |
| 7,779,982 B2 | 8/2010 | Fitzgerald et al. |
| 7,789,243 B2 | 9/2010 | Hornung et al. |
| 7,792,753 B1 | 9/2010 | Slater et al. |
| 7,797,239 B2 | 9/2010 | Smith |
| 7,802,721 B2 | 9/2010 | Wilson, Jr. et al. |
| 7,817,842 B2 | 10/2010 | Mennie |
| 7,822,629 B2 | 10/2010 | Chen et al. |
| 7,849,994 B2 | 12/2010 | Klein et al. |
| 7,873,200 B1 | 1/2011 | Oakes, III et al. |
| 7,873,576 B2 | 1/2011 | Jones et al. |

(56) References Cited

U.S. PATENT DOCUMENTS

| | | |
|---|---|---|
| 7,881,519 B2 | 2/2011 | Jones et al. |
| 7,882,000 B2 | 2/2011 | Jones |
| 7,885,451 B1 | 2/2011 | Walls et al. |
| 7,885,880 B1 | 2/2011 | Prasad et al. |
| 7,903,863 B2 | 3/2011 | Jones et al. |
| 7,929,749 B1 | 4/2011 | Jones et al. |
| 7,938,245 B2 | 5/2011 | Jenrick et al. |
| 7,946,406 B2 | 5/2011 | Blake et al. |
| 7,950,656 B2 | 5/2011 | Adams |
| 7,962,411 B1 | 6/2011 | Prasad et al. |
| 7,970,677 B1 | 6/2011 | Oakes, III et al. |
| 7,978,899 B2 | 7/2011 | Jenrick et al. |
| 8,025,213 B2 | 9/2011 | Hartfield et al. |
| 8,027,928 B1 | 9/2011 | Hecht, Jr. et al. |
| 8,041,098 B2 | 10/2011 | Jones et al. |
| 8,045,784 B2 | 10/2011 | Price et al. |
| 8,060,442 B1 | 11/2011 | Hecht et al. |
| 8,073,751 B2 | 12/2011 | Garg et al. |
| 8,082,207 B2 | 12/2011 | Bates et al. |
| 8,103,084 B2 | 1/2012 | Jones et al. |
| 8,125,624 B2 | 2/2012 | Jones et al. |
| 8,126,793 B2 | 2/2012 | Jones |
| 8,162,125 B1 | 4/2012 | Csulits et al. |
| 8,169,602 B2 | 5/2012 | Jones et al. |
| 8,204,293 B2 | 6/2012 | Csulits et al. |
| 8,214,373 B1 | 7/2012 | Bakir et al. |
| 8,214,686 B2 * | 7/2012 | Ueda ............... G06F 9/4856 714/15 |
| 8,265,346 B2 | 9/2012 | Blair |
| 8,290,216 B1 | 10/2012 | Blair |
| 8,297,428 B2 | 10/2012 | Renz et al. |
| 8,301,565 B2 | 10/2012 | Cantley et al. |
| 8,322,505 B2 | 12/2012 | Freeman et al. |
| 8,331,643 B2 | 12/2012 | Yacoubian et al. |
| 8,339,589 B2 | 12/2012 | Jones et al. |
| 8,412,605 B2 | 4/2013 | Griffin et al. |
| 8,474,704 B1 | 7/2013 | Grimm et al. |
| 8,504,456 B2 | 8/2013 | Griffin et al. |
| 8,526,751 B2 | 9/2013 | Mitchell et al. |
| 8,527,412 B1 | 9/2013 | Waldron, III et al. |
| 8,600,879 B2 | 12/2013 | Reyes |
| 8,610,966 B2 | 12/2013 | Hatzav et al. |
| 8,639,062 B2 | 1/2014 | Calman et al. |
| 8,714,336 B2 | 5/2014 | Csulits et al. |
| 8,718,367 B1 | 5/2014 | Schneider et al. |
| 8,738,529 B2 | 5/2014 | Kolhatkar et al. |
| 8,799,161 B2 | 8/2014 | Kreutz et al. |
| 8,824,785 B2 | 9/2014 | Ives et al. |
| 8,864,029 B2 | 10/2014 | McGlamery et al. |
| 9,025,851 B2 | 5/2015 | Smith et al. |
| 9,082,007 B2 | 7/2015 | Smith et al. |
| 2001/0034682 A1 | 10/2001 | Knight et al. |
| 2001/0037297 A1 | 11/2001 | McNair |
| 2001/0051921 A1 | 12/2001 | Garner, IV et al. |
| 2002/0038289 A1 | 3/2002 | Lawlor et al. |
| 2002/0072942 A1 | 6/2002 | Kuykendall et al. |
| 2002/0082994 A1 | 6/2002 | Herziger |
| 2002/0087409 A1 | 7/2002 | Joao |
| 2002/0128969 A1 | 9/2002 | Parmelee et al. |
| 2003/0059098 A1 | 3/2003 | Jones et al. |
| 2003/0066876 A1 | 4/2003 | Goldman et al. |
| 2003/0120586 A1 | 6/2003 | Litty |
| 2003/0126444 A1 | 7/2003 | Wakao et al. |
| 2003/0128375 A1 | 7/2003 | Ruhl et al. |
| 2003/0138128 A1 | 7/2003 | Rhoads |
| 2003/0217005 A1 | 11/2003 | Drummond et al. |
| 2004/0133516 A1 | 7/2004 | Buchanan et al. |
| 2004/0153650 A1 | 8/2004 | Hillmer |
| 2004/0153663 A1 | 8/2004 | Clark et al. |
| 2004/0218729 A1 | 11/2004 | Xue et al. |
| 2004/0245330 A1 | 12/2004 | Swift et al. |
| 2005/0034054 A1 | 2/2005 | Tsuyama et al. |
| 2005/0038756 A1 | 2/2005 | Nagel |
| 2005/0049950 A1 | 3/2005 | Johnson |
| 2005/0071283 A1 | 3/2005 | Randle et al. |
| 2005/0080701 A1 | 4/2005 | Tunney et al. |
| 2005/0097019 A1 | 5/2005 | Jacobs |
| 2005/0125296 A1 | 6/2005 | Tidwell et al. |
| 2005/0139670 A1 | 6/2005 | McGlamery et al. |
| 2005/0213805 A1 | 9/2005 | Blake et al. |
| 2005/0244035 A1 | 11/2005 | Klein et al. |
| 2005/0283609 A1 | 12/2005 | Langford |
| 2006/0028689 A1 | 2/2006 | Perry et al. |
| 2006/0059201 A1 | 3/2006 | Watanabe |
| 2006/0080245 A1 | 4/2006 | Bahl et al. |
| 2006/0089905 A1 | 4/2006 | Song et al. |
| 2006/0106717 A1 | 5/2006 | Randle et al. |
| 2006/0116898 A1 | 6/2006 | Peterson |
| 2006/0117182 A1 | 6/2006 | Wolff |
| 2006/0182331 A1 | 8/2006 | Gilson et al. |
| 2006/0212391 A1 | 9/2006 | Norman et al. |
| 2006/0212502 A1 | 9/2006 | Chatterjee |
| 2006/0248009 A1 | 11/2006 | Hicks et al. |
| 2006/0282660 A1 | 12/2006 | Varghese et al. |
| 2007/0043650 A1 | 2/2007 | Hughes et al. |
| 2007/0045395 A1 | 3/2007 | Corona et al. |
| 2007/0100750 A1 | 5/2007 | Hartfield et al. |
| 2007/0124241 A1 | 5/2007 | Newton |
| 2007/0150412 A1 | 6/2007 | Lamparello et al. |
| 2007/0174214 A1 | 7/2007 | Welsh et al. |
| 2007/0288382 A1 | 12/2007 | Narayanan et al. |
| 2008/0016358 A1 | 1/2008 | Filreis et al. |
| 2008/0040249 A1 | 2/2008 | Re et al. |
| 2008/0059962 A1 | 3/2008 | Ito |
| 2008/0077474 A1 | 3/2008 | Dumas et al. |
| 2008/0086420 A1 | 4/2008 | Gilder et al. |
| 2008/0086421 A1 | 4/2008 | Gilder et al. |
| 2008/0103800 A1 | 5/2008 | Domenikos et al. |
| 2008/0103972 A1 | 5/2008 | Lanc |
| 2008/0116257 A1 | 5/2008 | Fickling |
| 2008/0140576 A1 | 6/2008 | Lewis et al. |
| 2008/0249931 A1 | 10/2008 | Gilder et al. |
| 2008/0256167 A1 * | 10/2008 | Branson ............... G06F 9/5027 709/201 |
| 2008/0294514 A1 | 11/2008 | Calman |
| 2008/0294541 A1 | 11/2008 | Weinflash et al. |
| 2008/0307258 A1 * | 12/2008 | Challenger ......... G06F 11/1438 714/20 |
| 2008/0319922 A1 | 12/2008 | Lawrence et al. |
| 2009/0008442 A1 | 1/2009 | Buchanan et al. |
| 2009/0018958 A1 | 1/2009 | Aveyard et al. |
| 2009/0094148 A1 | 4/2009 | Gilder et al. |
| 2009/0106846 A1 | 4/2009 | Dupray et al. |
| 2009/0141962 A1 | 6/2009 | Borgia et al. |
| 2009/0150288 A1 | 6/2009 | Bishop et al. |
| 2009/0248560 A1 | 10/2009 | Recce et al. |
| 2009/0248573 A1 | 10/2009 | Haggerty et al. |
| 2009/0309694 A1 | 12/2009 | Nichols et al. |
| 2010/0030644 A1 | 2/2010 | Dhamodharan |
| 2010/0070415 A1 | 3/2010 | Buchanan et al. |
| 2010/0122216 A1 | 5/2010 | Song et al. |
| 2010/0161466 A1 | 6/2010 | Gilder |
| 2010/0299553 A1 | 11/2010 | Cen |
| 2010/0306111 A1 | 12/2010 | Slater et al. |
| 2011/0066547 A1 | 3/2011 | Clark et al. |
| 2011/0099067 A1 | 4/2011 | Cooper et al. |
| 2011/0161346 A1 | 6/2011 | Solihin |
| 2011/0215034 A1 | 9/2011 | Mennie et al. |
| 2011/0276483 A1 | 11/2011 | Saegert et al. |
| 2012/0117423 A1 * | 5/2012 | Andrade ............. G06F 11/1438 714/16 |
| 2012/0189186 A1 | 7/2012 | Csulits et al. |
| 2013/0024360 A1 | 1/2013 | Ballout |
| 2013/0097464 A1 | 4/2013 | Ahmad |
| 2014/0250336 A1 | 9/2014 | Tepus |
| 2014/0281704 A1 * | 9/2014 | Jacobson ............. G06F 11/1415 714/15 |
| 2015/0195190 A1 | 7/2015 | Shah Heydari et al. |

(56) References Cited

U.S. PATENT DOCUMENTS

2016/0034362 A1\* 2/2016 Al-Wahabi ............ G06F 11/203
714/4.1
2017/0168959 A1 6/2017 Dodonov

FOREIGN PATENT DOCUMENTS

| CN | 101059863 A | 10/2007 |
|---|---|---|
| EP | 115189 A1 | 10/1987 |
| EP | 671696 A1 | 9/1995 |
| EP | 1507243 A2 | 2/2005 |
| JP | 2006155439 A | 6/2006 |
| WO | 03040881 A2 | 5/2003 |
| WO | 2004036386 A2 | 4/2004 |
| WO | 2005006269 A1 | 1/2005 |

OTHER PUBLICATIONS

Chen, Ming-ju et al. "A Digital Watermarking of Detecting the Image Integrity Based on DWT." Information and Electronic Engineering. vol. 6, No. 2, Apr. 2008. Chinese Language. 4 pages.
Han, Shui-Hua et al. "Content-based image authentication: current status, issues, and challenges." Int. J. Inf. Secur. (2010) 9:19-32. DOI 10.1007/s10207-009-0093-2. Regular Contribution. Published Online Oct. 8, 2009. 0 Springer-Verlag 2009.
International Preliminary Report of Patentability and Written Opinion dated Jun. 5, 2012 for International Application No. PCT/US2010/058380.
International Preliminary Report of Patentability and Written Opinion dated Jun. 5, 2012 for International Application No. PCT/US2010/058403.
International Preliminary Report of Patentability and Written Opinion dated Jun. 5, 2012 for International Application No. PCT/US2010/058409.
International Preliminary Report of Patentability and Written Opinion dated Jun. 5, 2012 for International Application No. PCT/US2010/058414.
International Preliminary Report on Patentability dated Apr. 22, 2010 for International Application No. PCT/US2008/085873.
International Preliminary Report on Patentability dated Jul. 3, 2006 for International Application No. PCT/US2004/043832.
International Search Report and Written Opinion dated Jan. 24, 2011 for International Application No. PCT/US2010/058403.
International Search Report and Written Opinion dated Jan. 24, 2011 for International Application No. PCT/US2010/058414.
International Search Report and Written Opinion dated Jan. 31, 2011 for International Application No. PCT/US2010/058409.
International Search Report and Written Opinion dated Jan. 24, 2011 for International Application No. PCT/US2010/058380.
International Search Report dated Apr. 23, 2008 for International Application No. PCT/US2007/083198.
International Search Report and Written Opinion dated May 19, 2005 for International Application No. PCT/US2004/043832.
Kwak et al., "Benefits, obstacles, and future of six sigma approach", Technovation, vol. 26, pp. 708-715, 2006.
Labys, W. P. (2001). Essays on microstructure and the use of information in limit order markets. (Order No. 3003649, University of Pennsylvania). ProQuest Dissertations and Theses, 195-195 p. Retrieved from http://search.proquest.com/docview/251101049?accountid=14753. (251101049).
Mitchell, Joseph Pershing, I., 11. (2000) The central bankers: Administrative legitimacy and the federal reserve system. (Order No. 3065450, Virginia Polytechnic Institute and State University). ProQuest Dissertations and Theses, 269-269 p. Retrieved from http://search.proquest.com/docview/304626254?accountid=14753. (304626254).
Muller, J. D. (1998). Selected development in the law of cyberspace payments. The Business Lawyer, 54(1), 403-441. Retrieved from http://search.proquest.com/docview/228450582?accountid=14753.
Patricia Murphy, It's a Time of Change for Check Processing, May 2004, USBanker, pp. 1-5.
State Intellectual Property Office of the People's Republic of China. Chinese Office Action dated May 11, 2012. Chinese Application No. 200810177822.1. Name of Applicant: Bank of America Corporation. Chinese Language. 34 pages.

\* cited by examiner

SYSTEM FOR DISTRIBUTED DATA PROCESSING WITH AUTO-RECOVERY

BACKGROUND

Entities typically receive large volumes of documents from vendors, customers, or employees on any given day. Each document, especially if it is a financial instrument, is often reconciled with a batch of similar financial instruments for further processing. A financial instrument processing system may include many nodes or modules that are used to process a financial instrument including determining whether the instrument is an exception, which may mean the financial instrument includes an ambiguity or otherwise contains a problem needing remediation action.

BRIEF SUMMARY

Embodiments of the present invention address the above needs and/or achieve other advantages by providing apparatuses (e.g., a system, computer program product and/or other devices) and methods for monitoring module or node usage in a data processing system.

According to embodiments of the invention, a data processing system for distributed data processing includes a memory device with computer-readable program code stored thereon; a communication device; a processing device operatively coupled to the memory device and the communication device, wherein the processing device is configured to execute the computer-readable program code to access a master queue of data processing work comprising a plurality of data processing jobs stored in a long term memory cache; select at least one of the plurality of data processing jobs from the master queue of data processing work; divide the at least one data processing job into a plurality of data processing items; and allocate each of the plurality of data processing items to a different one of a distributed network comprising a plurality of distributed user systems to ensure maximum efficiency in processing the at least one data processing job.

In some embodiments, the processing device is further configured to execute computer-readable code to store the data processing jobs in an in-flight data table; and monitor the in-flight data table to ensure efficient data processing of the data processing job.

In some embodiments, the processing device is further configured to execute computer-readable code to actively synchronize some or all the plurality of data processing items among the plurality of distributed user systems. In some such embodiments, actively synchronizing the data processing items comprises repeatedly or periodically saving a status of progress of data processing. In other such embodiments, actively synchronizing the data processing items comprises repeatedly or periodically saving results of the data processing. In some of these embodiments, the processing device is further configured to execute computer-readable code to automatically recover, in response to a processing fault by one of the user systems, completed data processing work using the saved results of the data processing. In others of these embodiments, actively synchronizing the data processing items comprises processing the data processing items at a smallest block level allowed by each of the distributed user systems, thereby maximizing efficiency of automatic recovery of completed data processing work. In yet others of these embodiments, the repeated or periodic saving of results of the data processing comprises saving some or all the results on the distributed network of user systems.

In some embodiments, the processing device is further configured to execute computer-readable code to determine a work capacity for each of the user systems on the distributed network; and wherein allocating is based on the determined work capacity for each of the user systems.

According to embodiments of the invention, a computer program product for distributed data processing has at least one non-transitory computer-readable medium having computer-readable program code portions embodied therein. The computer-readable program code portions include an executable portion configured for accessing a master queue of data processing work comprising a plurality of data processing jobs stored in a long term memory cache; an executable portion configured for selecting at least one of the plurality of data processing jobs from the master queue of data processing work; an executable portion configured for dividing the at least one data processing job into a plurality of data processing items; and an executable portion configured for allocating each of the plurality of data processing items to a different one of a distributed network comprising a plurality of distributed user systems to ensure maximum efficiency in processing the at least one data processing job.

In some embodiments, the computer-readable program code portions further comprise an executable portion configured for storing the data processing jobs in an in-flight data table; and an executable portion configured for monitoring the in-flight data table to ensure efficient data processing of the data processing job. In some embodiments, the computer-readable program code portions further comprise an executable portion configured for actively synchronizing some or all the plurality of data processing items among the plurality of distributed user systems. In some such embodiments, actively synchronizing the data processing items comprises repeatedly or periodically saving a status of progress of data processing. In other such embodiments, actively synchronizing the data processing items comprises repeatedly or periodically saving results of the data processing. In some of these embodiments, the computer-readable program code portions further comprise an executable portion configured for automatically recovering, in response to a processing fault by one of the user systems, completed data processing work using the saved results of the data processing. In others of these embodiments, actively synchronizing the data processing items comprises processing the data processing items at a smallest block level allowed by each of the distributed user systems, thereby maximizing efficiency of automatic recovery of completed data processing work. In yet others of these embodiments, the repeated or periodic saving of results of the data processing comprises saving some or all the results on the distributed network of user systems.

In some embodiments, the computer-readable program code portions further comprise an executable portion configured for determining a work capacity for each of the user systems on the distributed network; and wherein allocating is based on the determined work capacity for each of the user systems.

According to embodiments of the invention, a computer-implemented method for distributed data processing includes accessing a master queue of data processing work comprising a plurality of data processing jobs stored in a long term memory cache; selecting at least one of the plurality of data processing jobs from the master queue of data processing work; dividing the at least one data processing job into a plurality of data processing items; and allocating each of the plurality of data processing items to a different one of a distributed network comprising a plurality of distributed user systems to ensure maximum efficiency in processing the at least one data processing job.

In some embodiments the method also includes storing the data processing jobs in an in-flight data table; and monitoring the in-flight data table to ensure efficient data processing of the data processing job.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
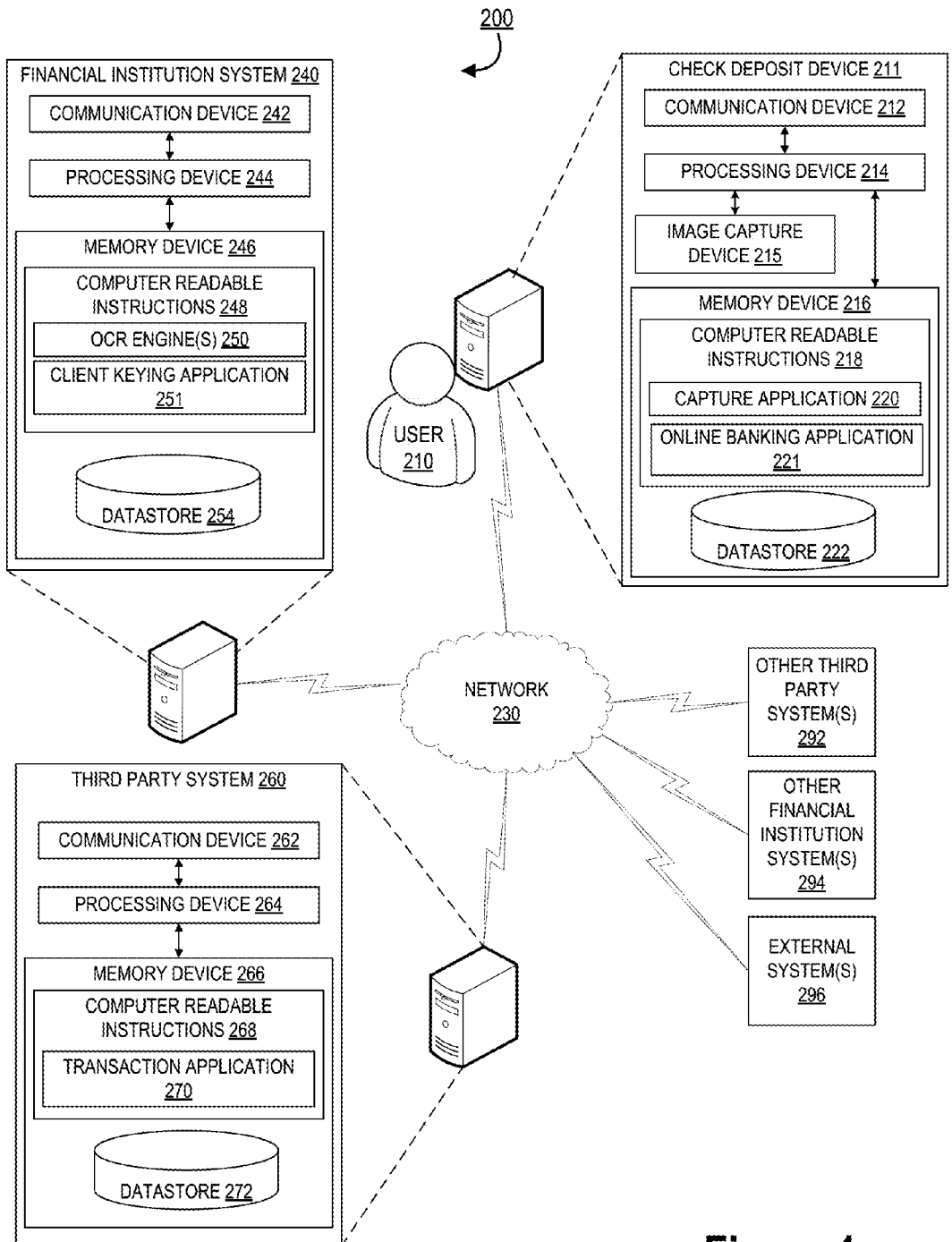
Figure 2A:
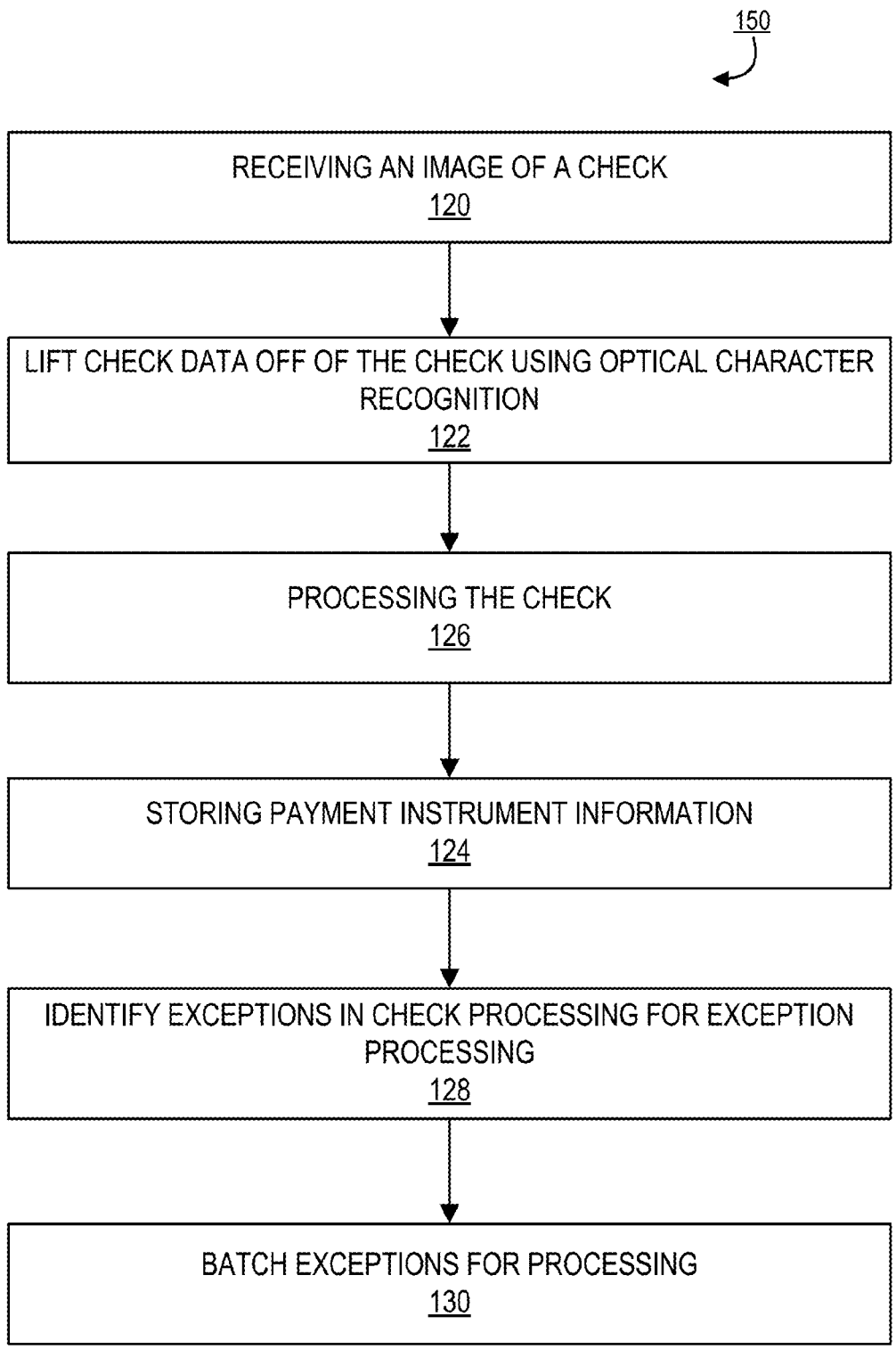
Figure 2B:
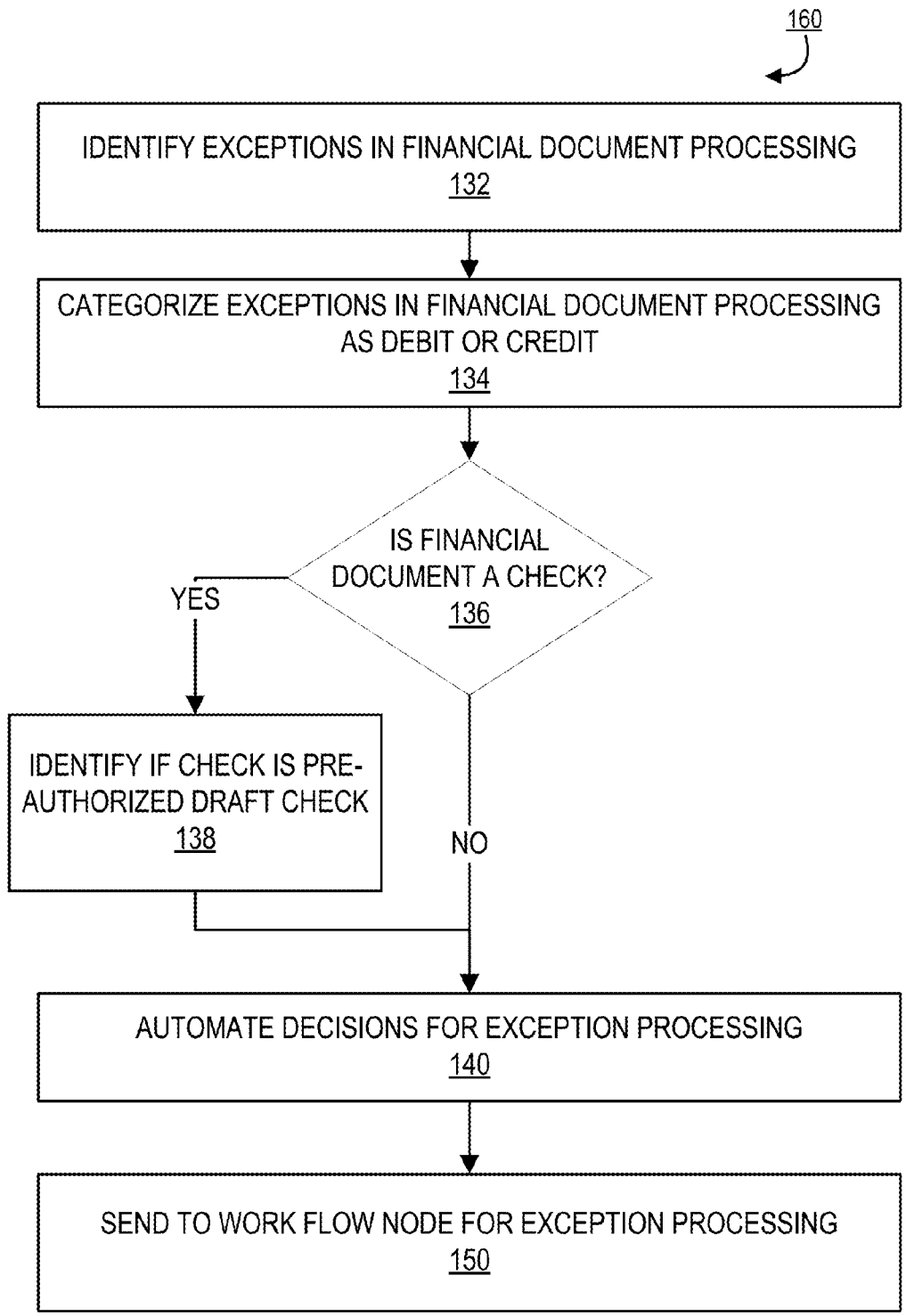
Figure 3:
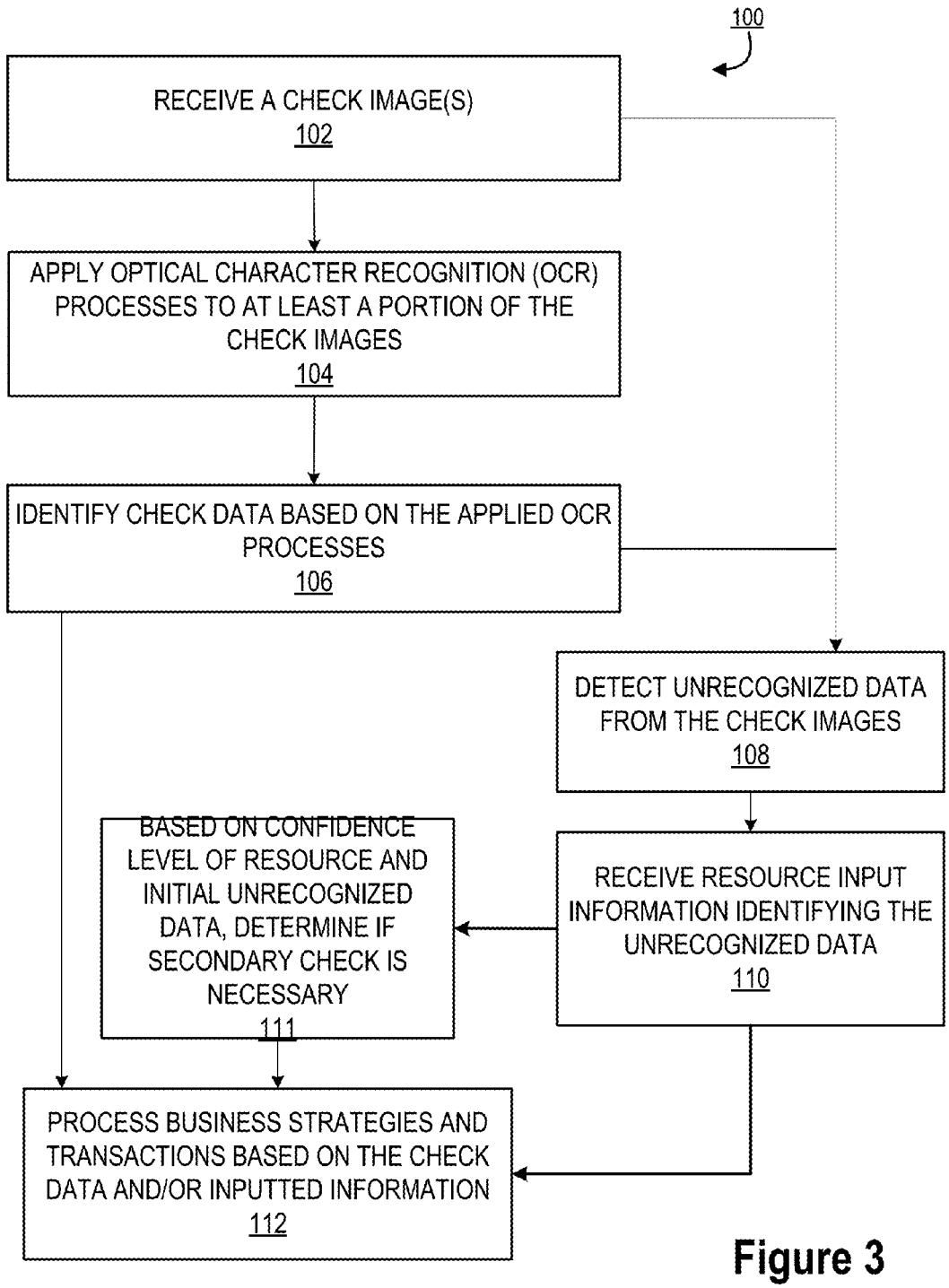
Figure 4:
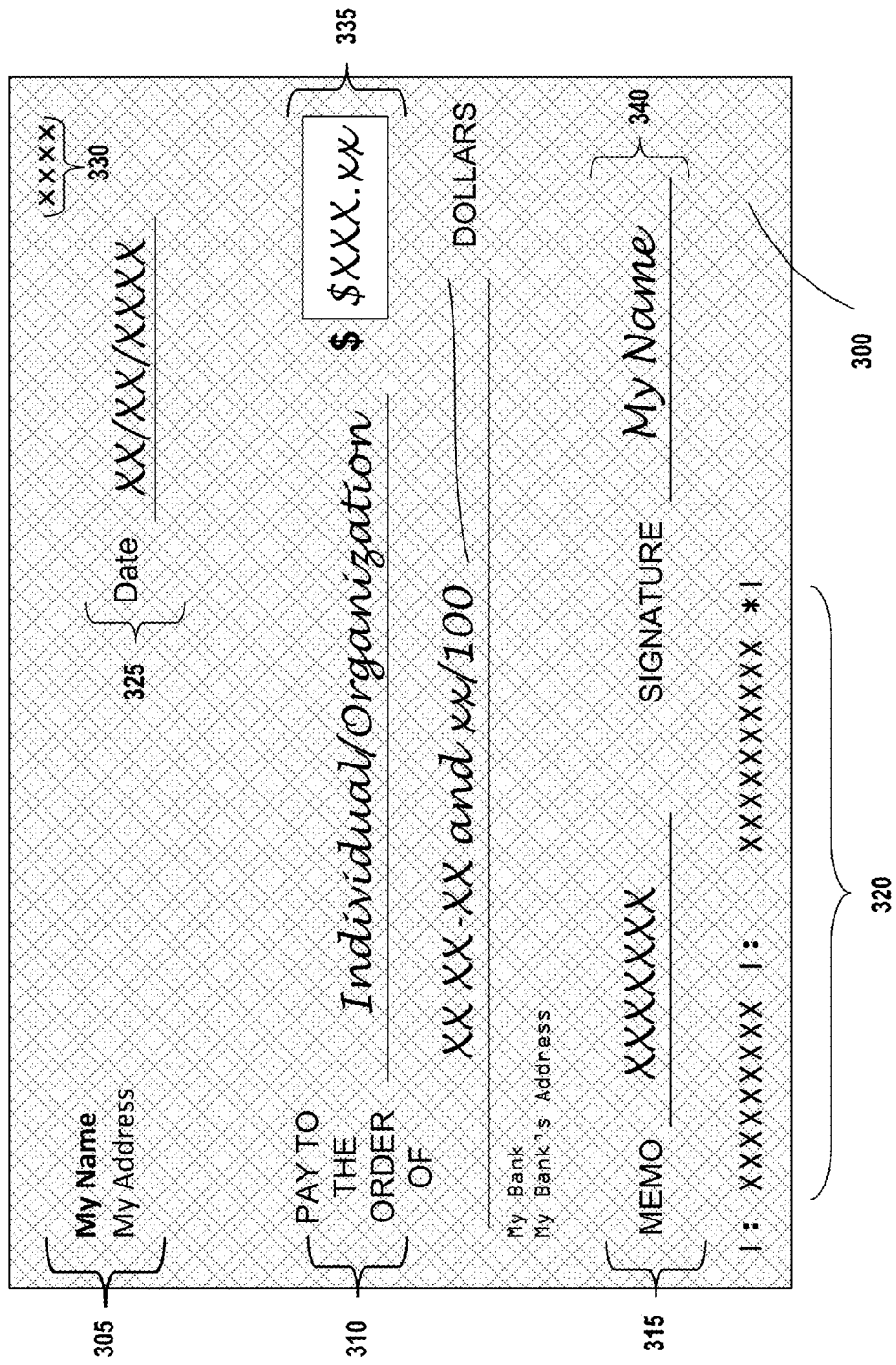
Figure 5:
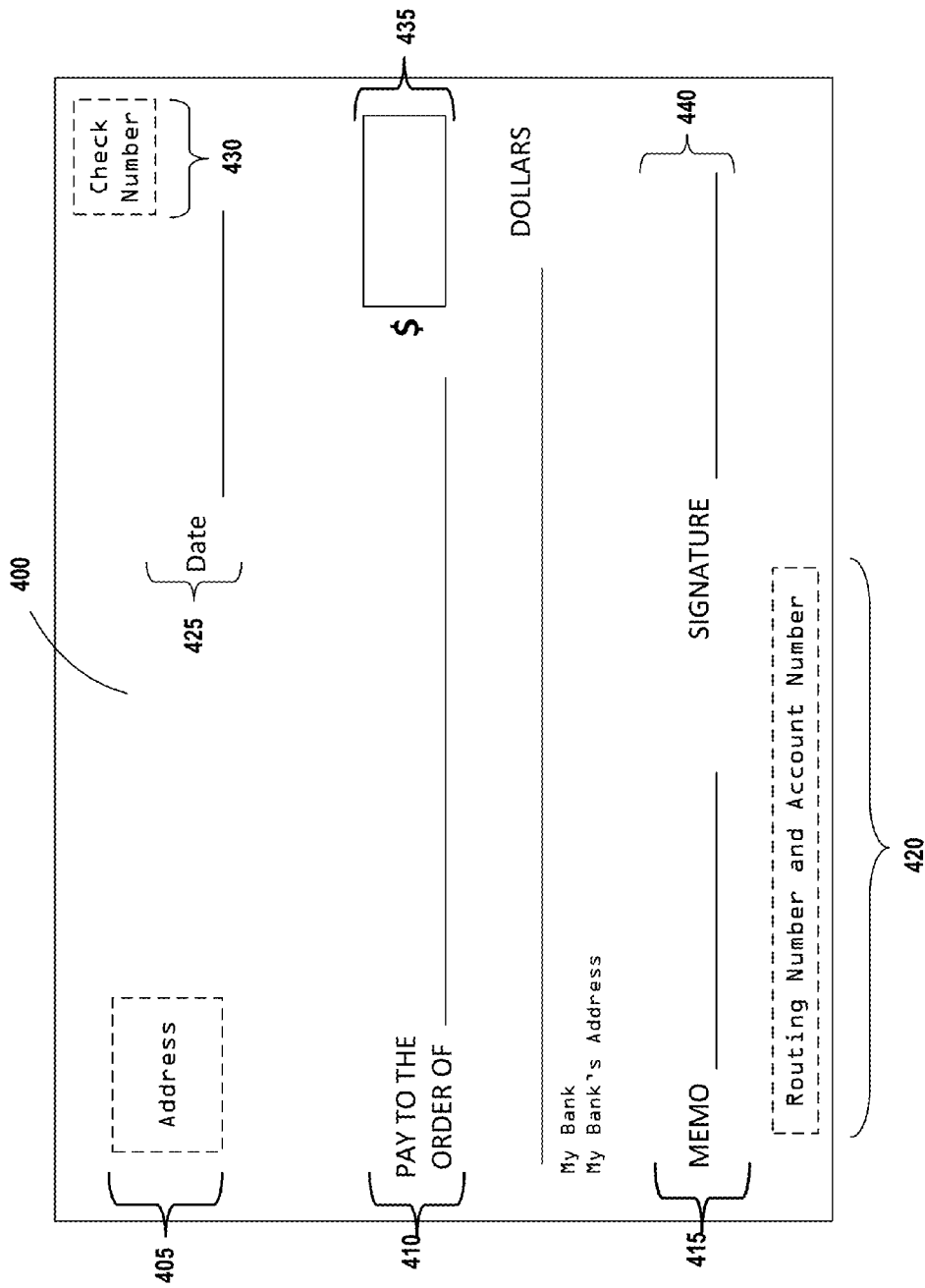
Figure 6:
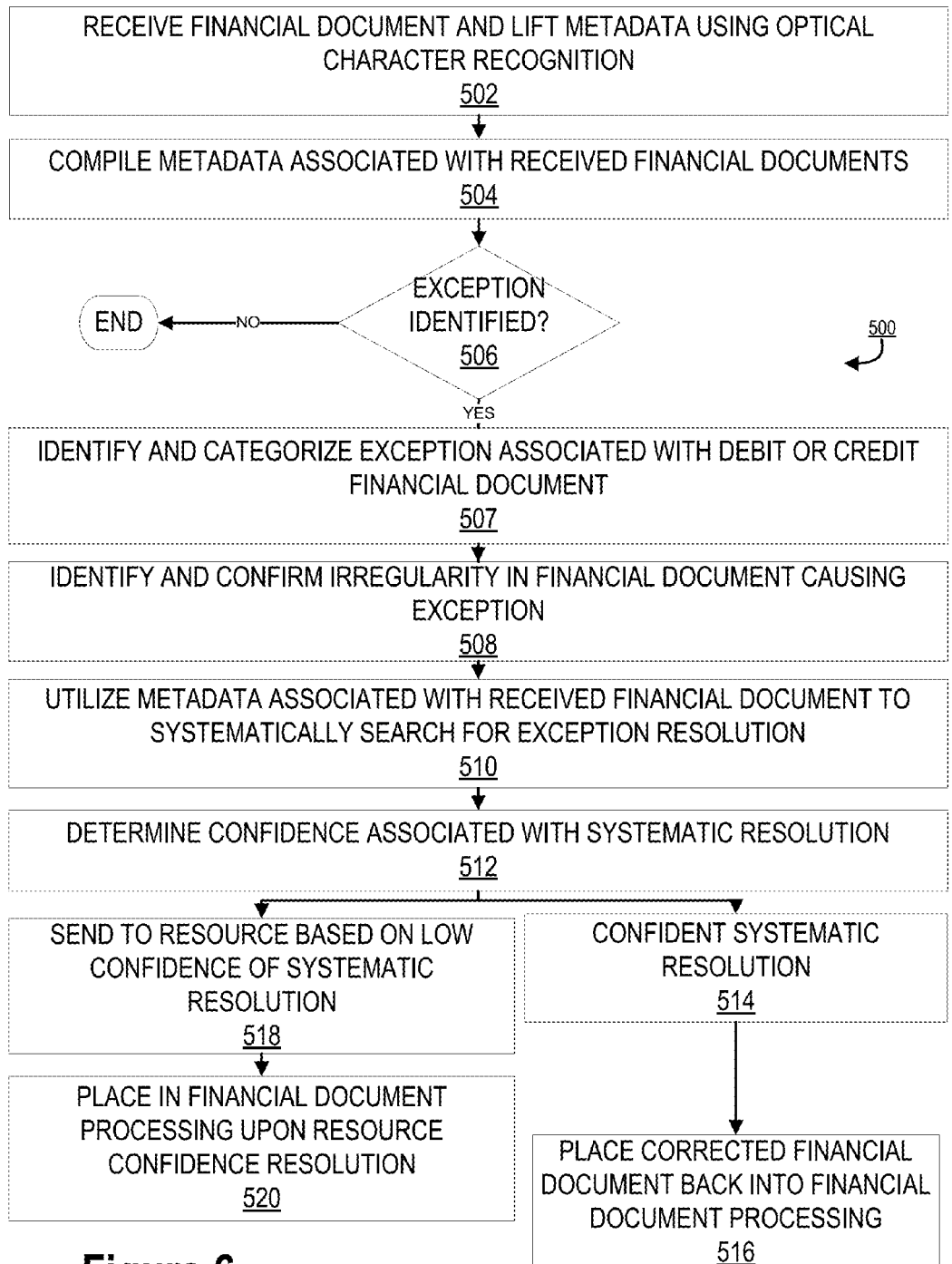
Figure 7:
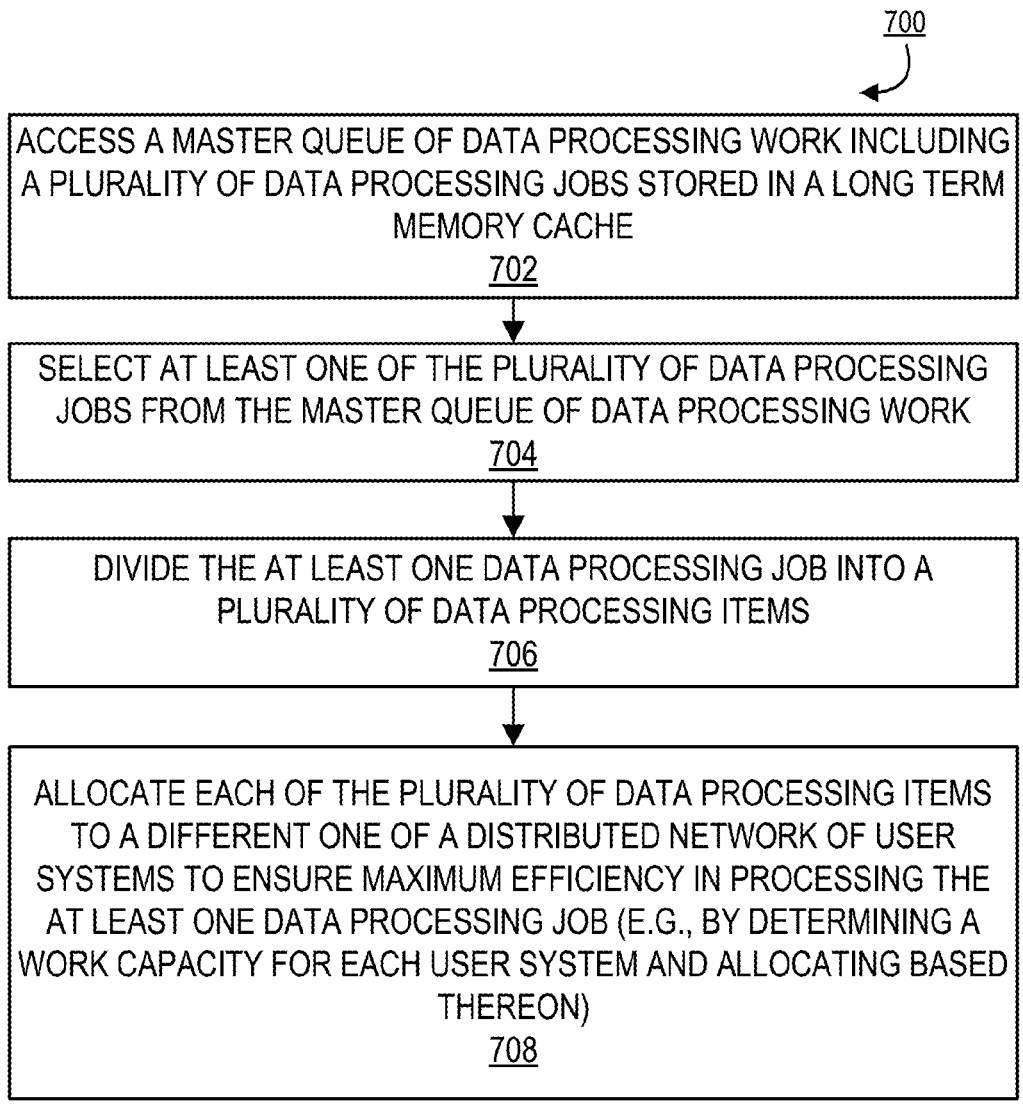
Figure 8:
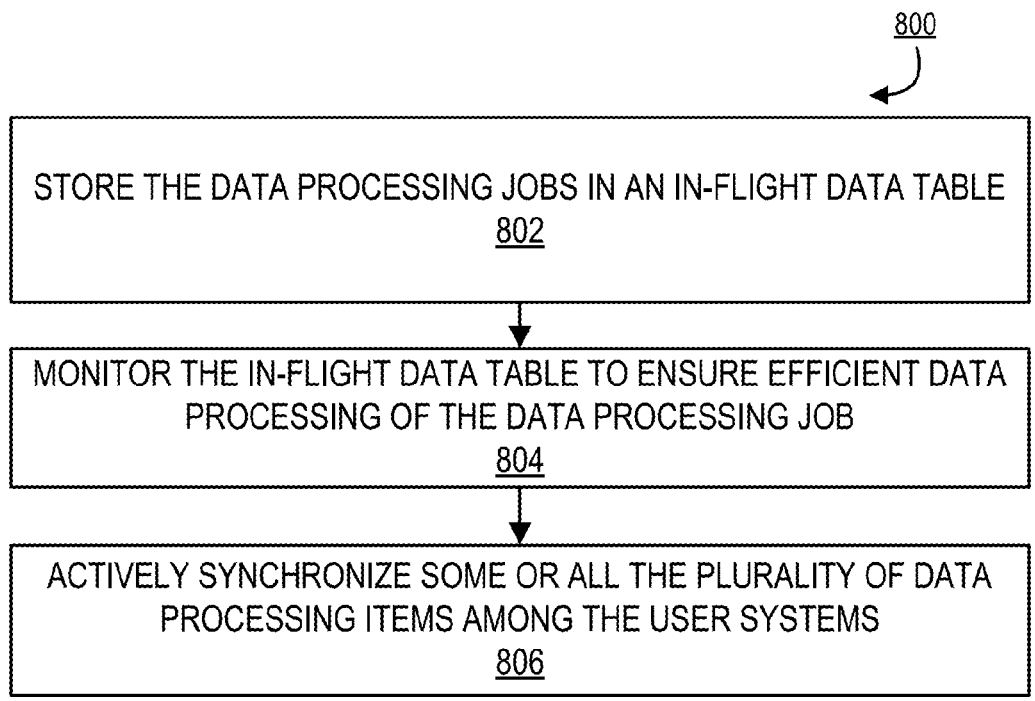
Figure 9:
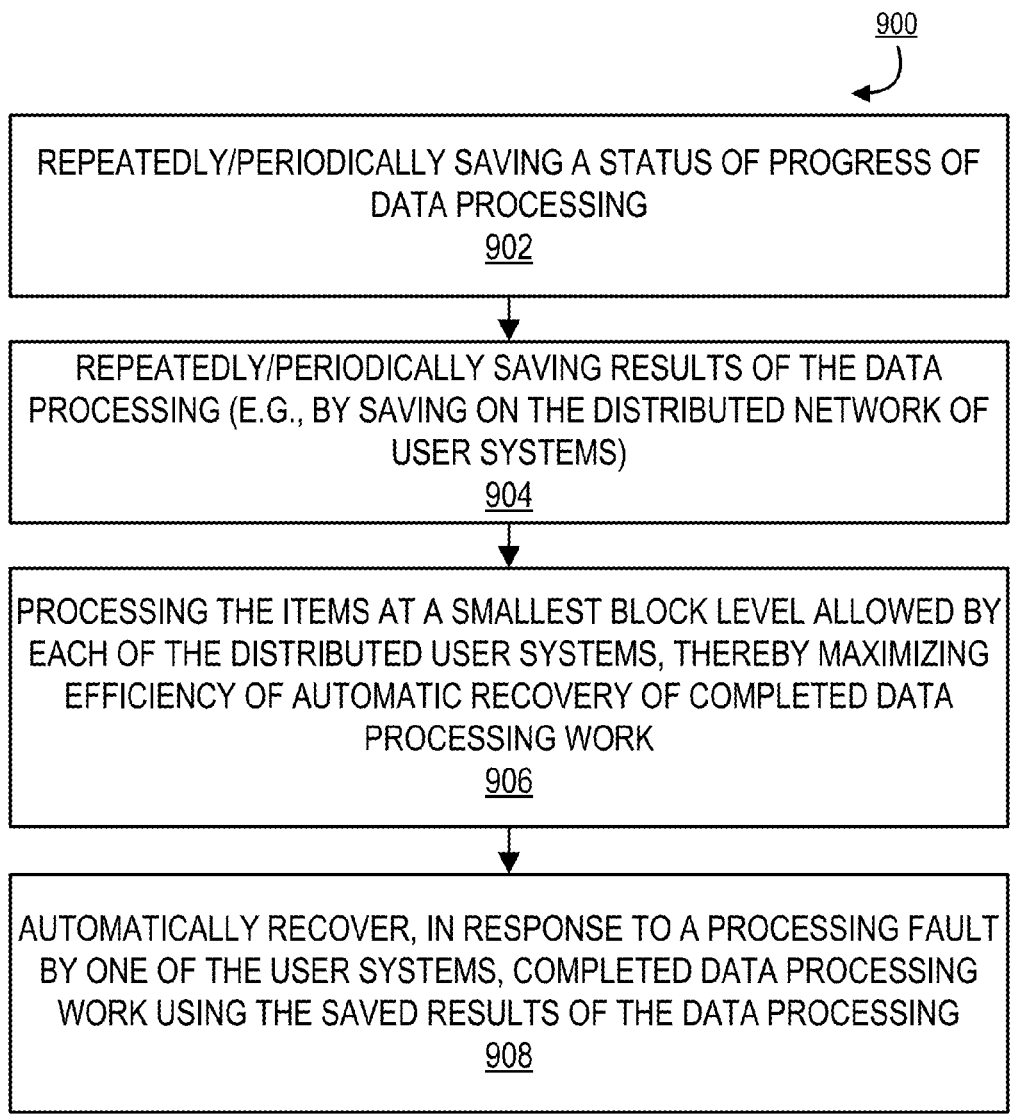
Figure 10:
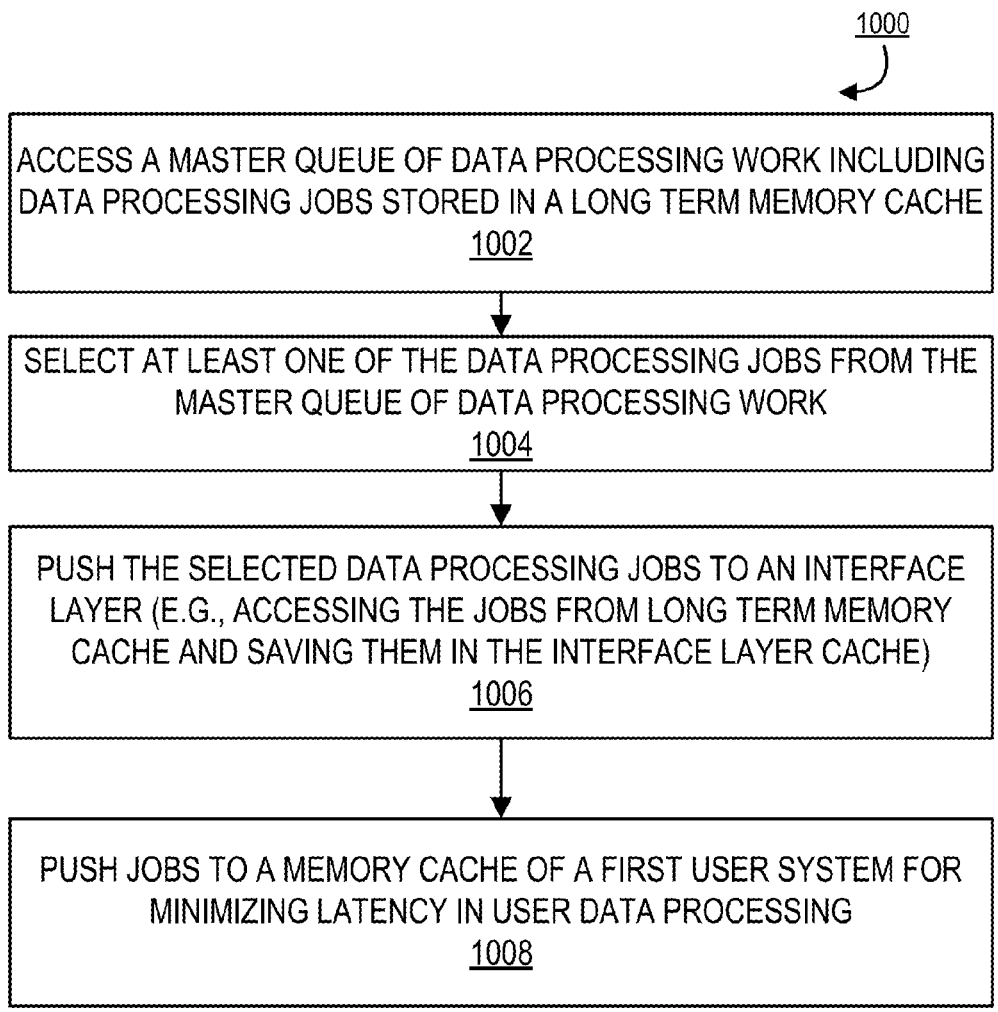
Figure 11:
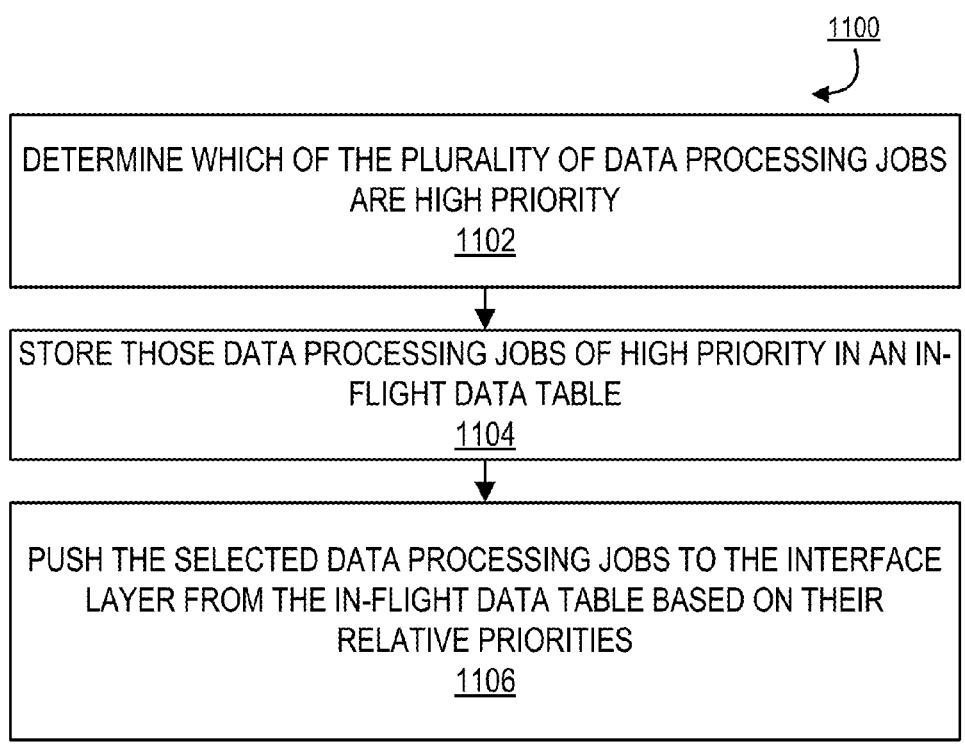
Figure 12:
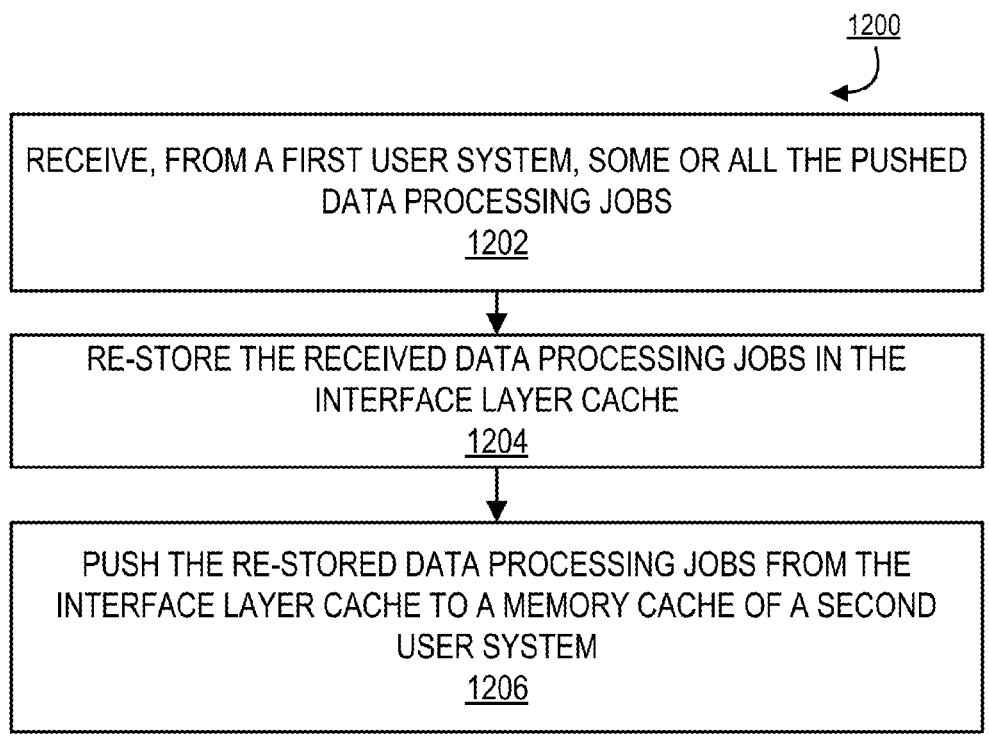
Figure 13:
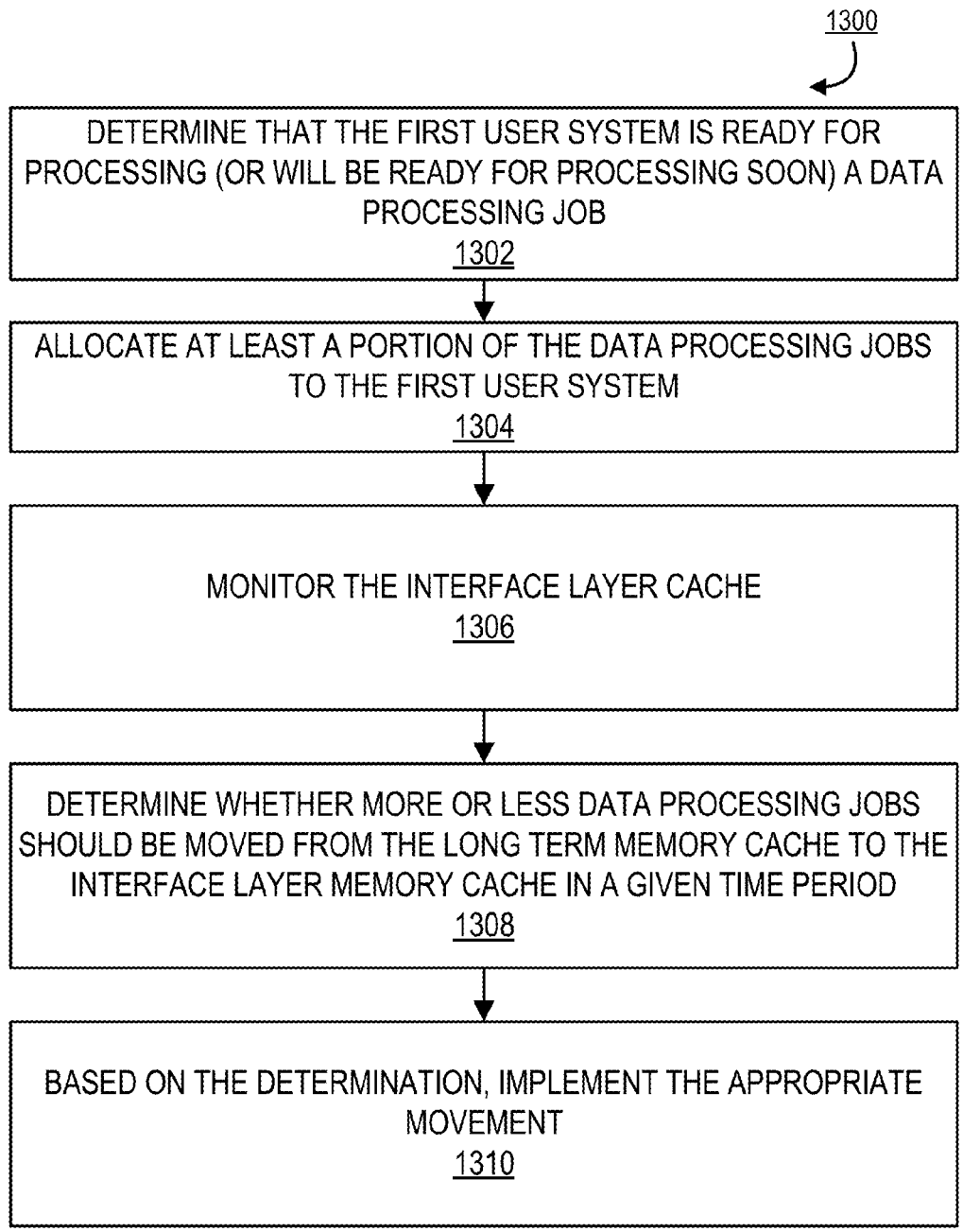
Figure 14:
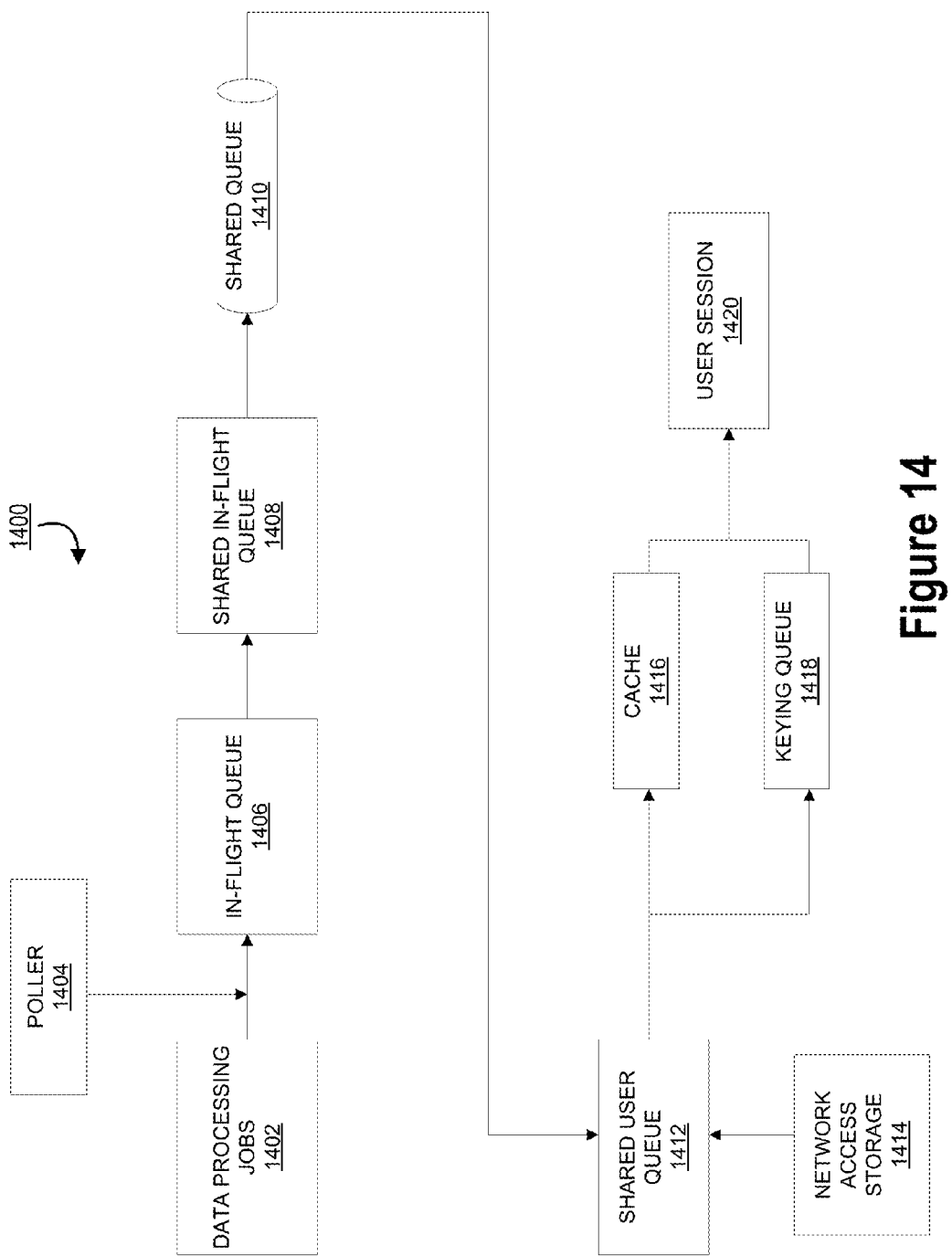
Figure 15:
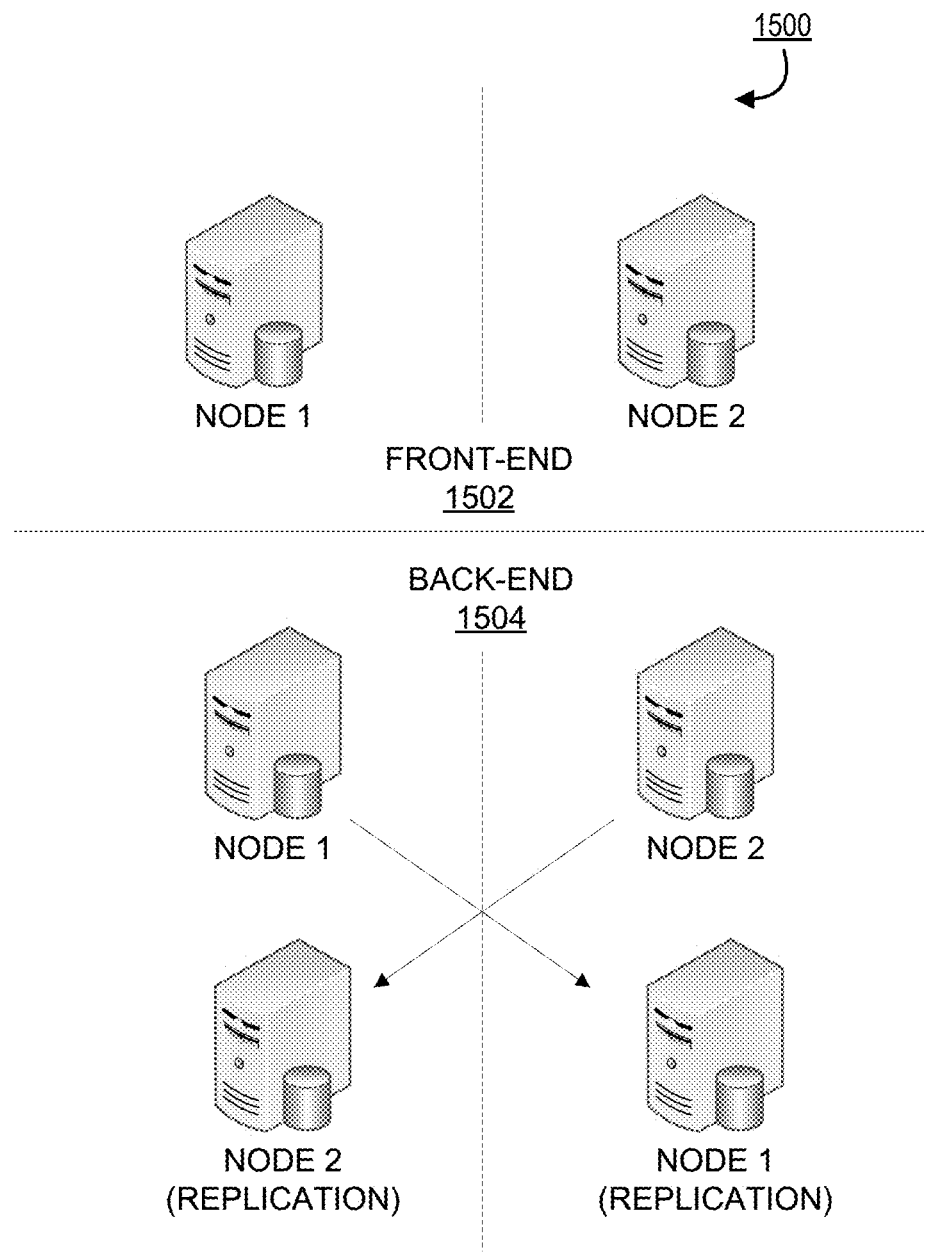

Having thus described embodiments of the invention in general terms, reference will now be made to the accompanying drawings, wherein:

FIG. 1 provides a dynamic resource management for document exception processing system environment, in accordance with one embodiment of the present invention;

FIG. 2A provides a high level process flow illustrating document exception identification and processing, in accordance with one embodiment of the present invention;

FIG. 2B provides a high level process flow illustrating general data lifting for document exception processing, in accordance with one embodiment of the present invention;

FIG. 3 provides a high level process flow illustrating identifying and extracting data from payment instruments, in accordance with one embodiment of the present invention;

FIG. 4 illustrates an exemplary image of a financial record, in accordance with one embodiment of the present invention;

FIG. 5 provides an exemplary template of a financial record, in accordance with one embodiment of the present invention;

FIG. 6 provides a process flow illustrating exception processing, in accordance with one embodiment of the present invention;

FIG. 7 provides a process flow illustrating a method for distributed data processing according to embodiments of the invention;

FIG. 8 provides a process flow illustrating a method for using in-flight tables for maximizing processing efficiency according to embodiments of the invention;

FIG. 9 provides a process flow illustrating a method for synchronizing and recovering data processing according to embodiments of the invention;

FIG. 10 provides a process flow illustrating a method for distributed data processing with automatic caching at multiple system levels according to embodiments of the invention;

FIG. 11 provides a process flow illustrating a method for selecting and pushing data processing jobs using in-flight data tables according to embodiments of the invention;

FIG. 12 provides a process flow illustrating a method for reallocating jobs according to embodiments of the invention;

FIG. 13 provides a process flow illustrating a method for adjusting caches and allocating jobs according to embodiments of the invention;

FIG. 14 illustrates a data flow for distributed data processing with our recovery, in accordance with an embodiment of the invention; and FIG. 15 an overview of the system for distributed data processing with our recovery options, in accordance with an embodiment of the invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to elements throughout. Where possible, any terms expressed in the singular form herein are meant to also include the plural form and vice versa, unless explicitly stated otherwise. As used herein, a "document," "financial document," "financial record," or "payment instrument" may also refer to a myriad of financial documents, including but not limited to a lease document, a mortgage document, a deposit slip, a payment coupon, a receipt, general ledger tickets, or the like. In some embodiments, "document", "financial record" may exist as a physical item printed on paper or other medium. In other embodiments, the check may exist electronically. Furthermore, "document," "financial document," "financial record," or "payment instrument" may also refer to records associated with government data, legal data, identification data, and the like. Although the disclosure is directed to financial records, it will be understood that non-financial records such as social communications, advertising, blogs, opinion writing, and the like may also be applicable to the disclosure presented herein. In cases were non-financial records are use, it will be understood that personal information, such personal identifying information, account numbers, and the like, can be removed from the documents before they are released. For example, if a coupon or product review is to be used in advertising, personal information associated with such records will be removed before the advertising is presented to the public. The data of the financial records or non-financial records may be provided in a wide variety formats including, paper records, electronic or digital records, video records, audio records, and/or combinations thereof. In some embodiments, the "document" or "financial record" may be referred to in examples as a check or the like. Furthermore, the term "image lift data" or "data lift" may refer to the process of lifting one or more areas/elements of a document and storing those areas as metadata without storing the entire document as an image file.

Some portions of this disclosure are written in terms of a financial institution's unique position with respect document processing and retrieving. As such, a financial institution may be able to utilize its unique position to receive, store, process, and retrieve images of documents, such as those of a financial nature.

As presented herein, embodiments that detect and extract specific data from images and that analyze, process, and distribute extracted metadata are provided.

FIG. 1 illustrates a dynamic resource management for document exception processing system environment 200, in accordance with some embodiments of the invention. The environment 200 includes a check deposit device 211 associated or used with authorization of a user 210 (e.g., an account holder, a mobile application user, an image owner, a bank customer, and the like), a third party system 260, and a financial institution system 240. In some embodiments, the third party system 260 corresponds to a third party financial institution. The environment 200 further includes one or more third party systems 292 (e.g., a partner, agent, or contractor associated with a financial institution), one or more other financial institution systems 294 (e.g., a credit bureau, third party banks, and so forth), and one or more external systems 296.

The systems and devices communicate with one another over the network 230 and perform one or more of the various steps and/or methods according to embodiments of the disclosure discussed herein. The network 230 may include a local area network (LAN), a wide area network (WAN), and/or a global area network (GAN). The network 230 may provide for wireline, wireless, or a combination of wireline and wireless communication between devices in the network. In one embodiment, the network 230 includes the Internet.

The check deposit device 211, the third party system 260, and the financial institution system 240 each includes a computer system, server, multiple computer systems and/or servers or the like. The financial institution system 240, in the embodiments shown has a communication device 242 communicably coupled with a processing device 244, which is also communicably coupled with a memory device 246. The processing device 244 is configured to control the communication device 242 such that the financial institution system 240 communicates across the network 230 with one or more other systems. The processing device 244 is also configured to access the memory device 246 in order to read the computer readable instructions 248, which in some embodiments includes a one or more OCR engine applications 250 and a client keying application 251. The memory device 246 also includes a datastore 254 or database for storing pieces of data that can be accessed by the processing device 244. In some embodiments, the datastore 254 includes a check data repository.

As used herein, a "processing device," generally refers to a device or combination of devices having circuitry used for implementing the communication and/or logic functions of a particular system. For example, a processing device may include a digital signal processor device, a microprocessor device, and various analog-to-digital converters, digital-to-analog converters, and other support circuits and/or combinations of the foregoing. Control and signal processing functions of the system are allocated between these processing devices according to their respective capabilities. The processing device 214, 244, or 264 may further include functionality to operate one or more software programs based on computer-executable program code thereof, which may be stored in a memory. As the phrase is used herein, a processing device 214, 244, or 264 may be "configured to" perform a certain function in a variety of ways, including, for example, by having one or more general-purpose circuits perform the function by executing particular computer-executable program code embodied in computer-readable medium, and/or by having one or more application-specific circuits perform the function.

Furthermore, as used herein, a "memory device" generally refers to a device or combination of devices that store one or more forms of computer-readable media and/or computer-executable program code/instructions. Computer-readable media is defined in greater detail below. For example, in one embodiment, the memory device 246 includes any computer memory that provides an actual or virtual space to temporarily or permanently store data and/or commands provided to the processing device 244 when it carries out its functions described herein.

The check deposit device 211 includes a communication device 212 and an image capture device 215 (e.g., a camera) communicably coupled with a processing device 214, which is also communicably coupled with a memory device 216. The processing device 214 is configured to control the communication device 212 such that the check deposit device 211 communicates across the network 230 with one or more other systems. The processing device 214 is also configured to access the memory device 216 in order to read the computer readable instructions 218, which in some embodiments includes a capture application 220 and an online banking application 221. The memory device 216 also includes a datastore 222 or database for storing pieces of data that can be accessed by the processing device 214. The check deposit device 211 may be a mobile device of the user 210, a bank teller device, a third party device, an automated teller machine, a video teller machine, or another device capable of capturing a check image.

The third party system 260 includes a communication device 262 and an image capture device (not shown) communicably coupled with a processing device 264, which is also communicably coupled with a memory device 266. The processing device 264 is configured to control the communication device 262 such that the third party system 260 communicates across the network 230 with one or more other systems. The processing device 264 is also configured to access the memory device 266 in order to read the computer readable instructions 268, which in some embodiments includes a transaction application 270. The memory device 266 also includes a datastore 272 or database for storing pieces of data that can be accessed by the processing device 264.

In some embodiments, the capture application 220, the online banking application 221, and the transaction application 270 interact with the OCR engines 250 to receive or provide financial record images and data, detect and extract financial record data from financial record images, analyze financial record data, and implement business strategies, transactions, and processes. The OCR engines 250 and the client keying application 251 may be a suite of applications for conducting OCR.

In some embodiments, the capture application 220, the online banking application 221, and the transaction application 270 interact with the OCR engines 250 to utilize the extracted metadata to determine decisions for exception processing. In this way, the system may systematically resolve exceptions. The exceptions may include one or more irregularities such as bad micro line reads, outdated check stock, or misrepresentative checks that may result in a failure to match the check to an associated account for processing. As such, the system may identify the exception and code it for exception processing. Furthermore, the system may utilize the metadata to match the check to a particular account automatically.

In some embodiments, the capture application 220, the online banking application 221, and the transaction application 270 interact with the OCR engines 250 to utilize the extracted metadata for automated payment stops when detecting a suspect document or time during processing. In this way, the system may identify suspect items within the extracted metadata. The document or check processing may be stopped because of this identification. In some embodiments, the suspect items may be detected utilizing OCR based on data received from a customer external to the document in comparison to the document. In some embodiments, the suspect items may be detected utilizing OCR based on data associated with the account in comparison to the document.

In some embodiments, the capture application 220, the online banking application 221, and the transaction application 270 interact with the OCR engines 250 to utilize the extracted metadata for automated decisions for detecting and/or eliminating duplicate check processing. Duplicate checks may be detected and/or eliminated based on metadata matching. In this way, data may be lifted off of a document as metadata and compare the data to other documents utilizing the metadata form. As such, the system does not have to overlay images in order to detect duplicate documents.

The applications 220, 221, 250, 251, and 270 are for instructing the processing devices 214, 244 and 264 to perform various steps of the methods discussed herein, and/or other steps and/or similar steps. In various embodiments, one or more of the applications 220, 221, 250, 251, and 270 are included in the computer readable instructions stored in a memory device of one or more systems or devices other than the systems 260 and 240 and the check deposit device 211. For example, in some embodiments, the application 220 is stored and configured for being accessed by a processing device of one or more third party systems 292 connected to the network 230. In various embodiments, the applications 220, 221, 250, 251, and 270 stored and executed by different systems/devices are different. In some embodiments, the applications 220, 221, 250, 251, and 270 stored and executed by different systems may be similar and may be configured to communicate with one another, and in some embodiments, the applications 220, 221, 250, 251, and 270 may be considered to be working together as a singular application despite being stored and executed on different systems.

In various embodiments, one of the systems discussed above, such as the financial institution system 240, is more than one system and the various components of the system are not collocated, and in various embodiments, there are multiple components performing the functions indicated herein as a single device. For example, in one embodiment, multiple processing devices perform the functions of the processing device 244 of the financial institution system 240 described herein. In various embodiments, the financial institution system 240 includes one or more of the external systems 296 and/or any other system or component used in conjunction with or to perform any of the method steps discussed herein. For example, the financial institution system 240 may include a financial institution system, a credit agency system, and the like.

In various embodiments, the financial institution system 240, the third party system 260, and the check deposit device 211 and/or other systems may perform all or part of a one or more method steps discussed above and/or other method steps in association with the method steps discussed above. Furthermore, some or all the systems/devices discussed here, in association with other systems or without association with other systems, in association with steps being performed manually or without steps being performed manually, may perform one or more of the steps of method 300, the other methods discussed below, or other methods, processes or steps discussed herein or not discussed herein.

Referring now to FIG. 2A, FIG. 2A presents provides a high level process flow illustrating document exception identification and processing 150, in accordance with some embodiments of the invention. As illustrated in block 120, the method comprises receiving an image of a check. The image received may be one or more of a check, other document, payment instrument, and/or financial record. In some embodiments, the image of the check may be received by an specialized apparatus associated with the financial institution (e.g. a computer system) via a communicable link to a user's mobile device, a camera, an Automated Teller Machine (ATM) at one of the entity's facilities, a second apparatus at a teller's station, another financial institution, or the like. In other embodiments, the apparatus may be specially configured to capture the image of the check for storage and exception processing.

As illustrated in block 122, the system may then lift data off of the check (document, payment instrument, or financial record) using optical character recognition (OCR). The OCR processes enables the system to convert text and other symbols in the check images to other formats such as text files and/or metadata, which can then be used and incorporated into a variety of applications, documents, and processes. In some embodiments, OCR based algorithms used in the OCR processes incorporate pattern matching techniques. For example, each character in an imaged word, phrase, code, or string of alphanumeric text can be evaluated on a pixel-by-pixel basis and matched to a stored character. Various algorithms may be repeatedly applied to determine the best match between the image and stored characters.

After the successful retrieval or capture of the image of the check, the apparatus may process the check as illustrated in block 126. The apparatus may capture individual pieces of check information from the image of the check in metadata form. In some embodiments, the check information may be text. In other embodiments, the check information may be an image processed into a compatible data format.

As illustrated in block 124, the method comprises storing check information. After the image of the check is processed, the apparatus may store the lifted and collected check information in a compatible data format. In some embodiments, the check information may be stored as metadata. As such, individual elements of the check information may be stored separately, and may be associated with each other via metadata. In some embodiments, the individual pieces of check information may be stored together. In some embodiments, the apparatus may additionally store the original image of the check immediately after the image of the check is received.

As illustrated in block 128, the process 150 continues by identifying exceptions in the document processing. Exceptions may be one or more of irregularities such as bad micro line reads, outdated document stock, misrepresented items, or the like that result in a failure to match the document to an account. In some embodiments, the process may also detect duplicate documents. In yet other embodiments, the system may identify payment stops for specific documents.

Next, as illustrated in block 130, the process 150 continues to batch exceptions for processing and quieting them for resource review. In some embodiments, the system may first provide automated decisions for exception processing utilizing the lifted data. In this way, the system may utilize the data lifted from the document in order to rectify the exception identified in block 128. In this way, the system may be able to rectify the exception without having to have an individual manually override the exception and identify the account associated with the document with the exception. In some embodiments, a confidence of the automated decisions for exception processing may be generated. Upon a low confidence or that below a threshold such as 100%, 95%, or 90%, the system may queue the exception to a work flow node for payment instrument processing by a resource. The queue of the resource may be determined based on dynamic resource management described below.

Referring now to FIG. 2B, FIG. 2B presents provides a high level process flow illustrating general data lifting for document exception processing 160, in accordance with some embodiments of the invention. As illustrated in block 132, the process 160 starts by identifying the exceptions in financial document or payment instrument processing. Once identified, the documents associated with each of the one or more exceptions may be categorized as either debit or credit documents, as illustrated in block 134. In this way, the system may identify an exception and identify the type of document that the exception was identified from.

Next, as illustrate in decision block 136, the system may identify if the document is a check or if it is another financial document or payment instrument for processing. If the financial document is a check in decision block 136, the system will identify if the check is a pre-authorized draft check, as illustrated in block 138. In some embodiments, pre-authorized draft checks are made via online purchases that ask a user for his/her check number and routing number. The pre-authorized draft check is subsequently converted to paper form and submitted to the financial institution for processing. These pre-authorized draft checks may undergo a higher level of processing scrutiny to ensure authenticity, if necessary.

Next, as illustrated in block 140, automated decisions are created for the financial documents with exceptions based on lifted data and the type of exception identified. Once automated decisions are made, the system identifies a confidence of the automated decision.

In some embodiments, the system may send the exceptions for processing to a work flow node for exception processing by a resource, as illustrated in block 150. In yet other embodiments, the resource may receive an already automatically processed exception to confirm the correct processing.

Referring now to FIG. 3, FIG. 3 provides a high level process flow illustrating identifying and extracting data from payment instruments 100, in accordance with some embodiments in the invention. One or more devices, such as the one or more systems and/or one or more computing devices and/or servers of FIG. 3 can be configured to perform one or more steps of the process 100 or other processes described below. In some embodiments, the one or more devices performing the steps are associated with a financial institution. In other embodiments, the one or more devices performing the steps are associated with a merchant, business, partner, third party, credit agency, account holder, and/or user.

As illustrated at block 102, one or more check images are received. The check images comprise the front portion of a check, the back portion of a check, or any other portions of a check. In cases where there are several checks piled into a stack, the multiple check images may include, for example, at least a portion of each of the four sides of the check stack. In this way, any text, numbers, or other data provided on any side of the check stack may also be used in implementing the process 100. In some embodiments the system may receive financial documents, payment instruments, checks, or the likes.

In some embodiments, each of the check images comprises financial record data. The financial record data includes dates financial records are issued, terms of the financial record, time period that the financial record is in effect, identification of parties associated with the financial record, payee information, payor information, obligations of parties to a contract, purchase amount, loan amount, consideration for a contract, representations and warranties, product return policies, product descriptions, check numbers, document identifiers, account numbers, merchant codes, file identifiers, source identifiers, and the like.

Although check images are illustrated in FIG. 4 and FIG. 5, it will be understood that any type of financial record image may be received. Exemplary check images include PDF files, scanned documents, digital photographs, and the like. At least a portion of each of the check images, in some embodiments, is received from a financial institution, a merchant, a signatory of the financial record (e.g., the entity having authority to endorse or issue a financial record), and/or a party to a financial record. In other embodiments, the check images are received from image owners, account holders, agents of account holders, family members of account holders, financial institution customers, payors, payees, third parties, and the like. In some embodiments, the source of at least one of the checks includes an authorized source such as an account holder or a third party financial institution. In other embodiments, the source of at least one of the checks includes an unauthorized source such as an entity that intentionally or unintentionally deposits or provides a check image to the system of process 100.

In some exemplary embodiments, a customer or other entity takes a picture of a check at a point of sales or an automated teller machine (ATM) and communicates the resulting check image to a point of sales device or ATM via wireless technologies, near field communication (NFC), radio frequency identification (RFID), and other technologies. In other examples, the customer uploads or otherwise sends the check image to the system of process 100 via email, short messaging service (SMS) text, a web portal, online account, mobile applications, and the like. For example, the customer may upload a check image to deposit funds into an account or pay a bill via a mobile banking application using a capture device. The capture device can include any type or number of devices for capturing images or converting a check to any type of electronic format such as a camera, personal computer, laptop, notebook, scanner, mobile device, and/or other device.

As illustrated at block 104, optical character recognition (OCR) processes are applied to at least a portion of the check images. At least one OCR process may be applied to each of the check images or some of the check images. The OCR processes enables the system to convert text and other symbols in the check images to other formats such as text files and/or metadata, which can then be used and incorporated into a variety of applications, documents, and processes. In some embodiments, OCR based algorithms used in the OCR processes incorporate pattern matching techniques. For example, each character in an imaged word, phrase, code, or string of alphanumeric text can be evaluated on a pixel-by-pixel basis and matched to a stored character. Various algorithms may be repeatedly applied to determine the best match between the image and stored characters.

As illustrated in block 106, the check data may be identified based on the applied OCR processing. In some embodiments, the OCR process includes location fields for determining the position of data on the check image. Based on the position of the data, the system can identify the type of data in the location fields to aid in character recognition. For example, an OCR engine may determine that text identified in the upper right portion of a check image corresponds to a check number. The location fields can be defined using any number of techniques. In some embodiments, the location fields are defined using heuristics. The heuristics may be embodied in rules that are applied by the system for determining approximate location.

In other embodiments, the system executing process flow 100 defines the location fields by separating the portions and/or elements of the image of the check into quadrants. As referred to herein, the term quadrant is used broadly to describe the process of differentiating elements of a check image by separating portions and/or elements of the image of the check into sectors in order to define the location fields. These sectors may be identified using a two-dimensional coordinate system or any other system that can be used for determining the location of the sectors. In many instances, each sector will be rectangular in shape. In some embodiments, the system identifies each portion of the image of the check using a plurality of quadrants. In such an embodiment, the system may further analyze each quadrant using the OCR algorithms in order to determine whether each quadrant has valuable or useful information. Generally, valuable or useful information may relate to any data or information that may be used for processing and/or settlement of the check, used for identifying the check, and the like. Once the system determines the quadrants of the image of the check having valuable and/or useful information, the system can extract the identified quadrants together with the information from the image of the check for storage. The quadrants may be extracted as metadata, text, or code representing the contents of the quadrant. In some embodiments, the quadrants of the image of the check that are not identified as having valuable and/or useful information are not extracted from the image.

In additional embodiments, the system uses a grid system to identify non-data and data elements of a check image. The grid system may be similar to the quadrant system. Using the grid system, the system identifies the position of each grid element using a coordinate system (e.g., x and y coordinates or x, y, and z coordinate system or the like) or similar system for identifying the spatial location of a grid element on a check. In practice, the spatial location of a grid element may be appended to or some manner related to grid elements with check data. For example, using the grid, the system may identify which grid elements of the grid contain data elements, such as check amount and payee name, and either at the time of image capture or extraction of the check image within the grid, the system can tag the grid element having the check data element with the grid element's spatial location. In some embodiments, the grid system and/or quadrant system is based on stock check templates obtained from check manufacturers or merchants.

In alternative or additional embodiments, the OCR process includes predefined fields to identify data. The predefined field includes one or more characters, words, or phrases that indicate a type of data. In such embodiments, the system of process 100 extracts all the data presented in the check image regardless of the location of the data and uses the predefined fields to aid in character recognition. For example, a predefined field containing the phrase "Pay to the order of" may be used to determine that data following the predefined field relates to payee information.

In addition to OCR processes, the system of process 100 can use other techniques such as image overlay to locate, identify, and extract data from the check images. In other embodiments, the system uses the magnetic ink character recognition (MICR) to determine the position of non-data (e.g., white space) and data elements on a check image. For example, the MICR of a check may indicate to the system that the received or captured check image is a business check with certain dimensions and also, detailing the location of data elements, such as the check amount box or Payee line. In such an instance, once the positions of this information is made available to the system, the system will know to capture any data elements to the right or to the left of the identified locations or include the identified data element in the capture. This system may choose to capture the data elements of a check in any manner using the information determined from the MICR number of the check.

As illustrated at block 108, unrecognized data from the check images is detected. In some embodiments, the unrecognized data includes characters, text, shading, or any other data not identified by the OCR processes. In such embodiments, the unrecognized data is detected following implementation of at least one of the OCR processes. In other embodiments, the unrecognized data is detected prior to application of the OCR processes. For example, the unrecognized data may be removed and separated from the check images or otherwise not subjected to the OCR processes. In one exemplary situation, the system may determine that handwritten portions of a check image should not undergo OCR processing due to the difficulty in identifying such handwritten portions. Exemplary unrecognized data includes handwritten text, blurred text, faded text, misaligned text, misspelled data, any data not recognized by the OCR processes or other data recognition techniques, and the like. In other cases, at least a portion of some or all of the check images may undergo pre-processing to enhance or correct the unrecognized data. For example, if the text of a check image is misaligned or blurry, the system may correct that portion of the check image before applying the OCR processes to increase the probability of successful text recognition in the OCR processes or other image processes.

As illustrated at block 110, in some embodiments the system will have one or more resources review the unrecognized data. As such, there may be one or more individuals reviewing the unrecognized data instead of mechanically reviewing the data. As illustrated in block 110, the system may receive input from the resource that provides information identifying the unrecognized data. As such, a resource may be provided with the portions of a check image corresponding to the unrecognized data. The resource can view the unrecognized data to translate the unrecognized data into text and input the translation into a check data repository. In this way, the system "learns" to recognize previously unrecognized data identified by the resource, such that when the system reviews the same or similar unrecognized data in the future, such data can be easily identified by reference to the check data repository.

In other embodiments, the system may present an online banking customer with the unrecognized data to solicit input directly from the customer. For example, the customer may be presented with operator-defined terms of previously unrecognized data to verify if such terms are correct. The system may solicit corrective input from the customer via an online banking portal, a mobile banking application, and the like. If an operator or resource initially determines that the handwriting on the memo line reads "house flaps," the customer may subsequently correct the operator's definition and update the check data repository so that the handwritten portion correctly corresponds to "mouse traps." In some embodiments, the customer's input is stored in a customer input repository, which is linked to the check data repository associated with the OCR processes. For example, the system can create a file path linking the customer input repository with the check data repository to automatically update the check data repository with the customer input. In other embodiments, the check data repository and/or customer input repository includes stored customer data or account data. Stored customer signatures, for example, may be included in the check data repository and/or customer input repository.

As illustrated at block 111, the process 100 continues by determining, based on the confidence level of the resource and initial unrecognized data, determine if a secondary check of the unrecognized data is necessary. As such, based on a confidence level determined from the resource, the system may require additional checking to confirm the accuracy of the identification of the unrecognized data from the check.

Finally, as illustrated in block 112, business strategies and transactions are processed based on at least one of the check data and the inputted information. Data extracted from the check images using the process 100 may be used to automate or enhance various processes such as remediating exception processes, replacing check images with check data in online statements, enforcing requirements regarding third party check deposits, facilitating check to automated clearing house transaction conversion, cross selling products, and so forth.

FIG. 4 provides an illustration of an exemplary image of a financial record 300, in accordance with one embodiment of the present invention. The financial record illustrated in FIG. 4 is a check. However, one will appreciate that any financial record, financial document, payment instrument, or the like may be provided.

The image of check 300 may comprise an image of the entire check, a thumbnail version of the image of the check, individual pieces of check information, all or some portion of the front of the check, all or some portion of the back of the check, or the like. Check 300 comprises check information, wherein the check information comprises contact information 305, the payee 310, the memo description 315, the account number and routing number 320 associated with the appropriate user or customer account, the date 325, the check number 330, the amount of the check 335, the signature 340, or the like. In some embodiments, the check information may comprise text. In other embodiments, the check information may comprise an image. A capture device may capture an image of the check 300 and transmit the image to a system of a financial institution via a network. The system may collect the check information from the image of the check 300 and store the check information in a datastore as metadata. In some embodiments, the pieces of check information may be stored in the datastore individually. In other embodiments, multiple pieces of check information may be stored in the datastore together.

FIG. 5 illustrates an exemplary template of a financial record 400, in accordance with one embodiment of the present invention. Again, the financial record illustrated in FIG. 5 is a check. However, one will appreciate that any financial record, financial document, payment instruments, or the like may be provided.

In the illustrated embodiment, the check template 400 corresponds to the entire front portion of a check, but it will be understood that the check template 400 may also correspond to individual pieces of check information, portions of a check, or the like. The check template, in some embodiments, includes the format of certain types of checks associated with a bank, a merchant, an account holder, types of checks, style of checks, check manufacturer, and so forth. By using the check template, the system may "learn" to map the key attributes of the check for faster and more accurate processing. In some embodiments, financial records are categorized by template. The check template 400 is only an exemplary template for a financial record, and other check templates or other financial record templates may be utilized to categorize checks or other financial records. The check template 400 can be used in the OCR processes, image overlay techniques, and the like.

The check template 400 comprises check information, wherein the check information includes, for example, a contact information field 405, a payee line field 410, a memo description field 415, an account number and routing number field 420 associated with the appropriate user or customer account, a date line field 425, a check number field 430, an amount box field 435, a signature line field 440, or the like.

FIG. 6 illustrates a process flow for exception processing 500, in accordance with one embodiment of the present invention. As illustrated in block 502, the process 500 is initiated when financial documents or payment instruments, such as checks, are received. The received financial document may be in various forms, such as in an image format. Processing of the document may proceed wherein the data from the document may be collected and lifted from the document as metadata. This metadata is lifted from the document utilizing optical character recognition (OCR). The OCR processes enables the system to convert text and other symbols in the document image to metadata, which can then be used and incorporated into exception processing. In some embodiments, OCR based algorithms used in the OCR processes incorporate pattern matching techniques. For example, each character in an imaged word, phrase, code, or string of alphanumeric text can be evaluated on a pixel-by-pixel basis and matched to a stored character. Various algorithms may be repeatedly applied to determine the best match between the image and stored characters.

Once the metadata is lifted from the document as illustrated in block 502, the process 500 continues to compile and store the metadata associated with the received financial documents, as illustrated in block 504. As such, after the image of the document, such as a check, is processed, the system may compile and store the lifted and collected check information as metadata. As such, individual elements of the check information may be stored separately, together, or the like. In this way, the system stores the type of document, the appearance of the document, the information on the document, such as numbers, accounts, dates, names, addresses, payee, payor, routing numbers, amounts, document backgrounds, or the like as metadata.

In some embodiments, the stored data may be structural metadata. As such, the data may be about the design and specification of the structure of the data. In other embodiments, the data may be descriptive metadata. As such, the data may be data describing in detail the content of the financial record or document. In some embodiments, the metadata as described herein may take the form of structural, descriptive and/or a combination thereof.

Next, as illustrated in decision block 506, the system monitors the received documents to identify exceptions in the document processing. Exceptions may be one or more of irregularities such as bad micro line reads, outdated document stock, misrepresented items, or the like that result in a failure to match the document to an account intended to be associated with that document. If no exception is identified, then the process 500 terminates.

As illustrated in block 507 the process 500 continues to identify and categorize any identified exceptions into financial documents associated with debits or financial documents associated with credits. As illustrated in block 508 the process 500 continues to confirm the irregularity in the financial document that lead to the exception identification in decision block 506. The irregularity that lead to the exception may be one or more of a bad micro line read, outdated documents (such as an outdated check or deposit statement), or a general failure of the document to match an existing financial account.

Next, as illustrated in block 510, the process 500 continues to utilize the metadata associated with the received financial documents to systematically search for exception resolutions. As such, providing automated decisions for exception processing utilizing the lifted metadata. As such, the metadata lifted from the financial documents may be utilized to search the accounts or other records at the financial institution to determine the correct account or record associated with the exception document. For example, the exception may include an outdated check. In this way, one or more of the routing numbers, account numbers, or the like may be incorrectly stated on the check. The system will take the data on that outdated check and convert it to a metadata format. Thus, the system will utilize the metadata format of the routing number or the like to search the financial institution records to identify that that particular routing number was used for a batch of checks for User 1. As such, the system will identify the correct user, User 1 associated with the check that had an exception. Other examples may include one or more of bad micro line reads, document or check format issues, or the like.

As such, the system may utilize the metadata lifted from the document in order to rectify the exception identified in decision block 506. In this way, the system may be able to rectify the exception without having to have an individual manually override the exception and identify the account associated with the document with the exception.

Next, as illustrated in block 512, the process 500 continues by determining a confidence associated with the systematic resolution for exception resolution. In this way, a confidence of the automated resolution is determined. If the confidence is not satisfactory, such as not being above a pre-determined threshold, the system may send the exception to a resource based on the confidence score not reaching a pre-determined threshold, as illustrated in block 518. Next, as illustrated in block 520, the system pay place the resolved exception into financial document processing after resolution and confirmation from the resource.

Referring back to block 512 of FIG. 6, if a confidence is generated significantly high enough to reach the pre-determined threshold, the system continues and automatically and systematically corrects the exception based on the match based on the confident systematic resolution, as illustrated in block 514. In some embodiments, there may be one or more threshold confidences related to the exception. As such, if a match has been made between the metadata and a financial account and it is above a pre-determined confidence, then the system may automatically correct the exception. However, in some embodiments, the system may request manual acceptance of the correction of the exception.

Finally, as illustrated in block 516, the corrected financial document may be placed back into the financial document processing for continued processing after the exception has been identified and corrected via systematic searching financial institution data utilizing metadata extracted from the original financial document with an exception.

Distributed Data Processing with Automated Recovery

According to embodiments of the invention, a system is used to load balance data processing among different networks to ensure high speed processing. The system has the ability to recover current status of processing in the event of an issue such as a system crash. The system divides a project into different work items. It then distributes the work items among multiple sites (i.e., within a distributed network of user systems) for processing in an "active-active" fashion. In other words, different portions of a project may be processed concurrently at multiple nodes within the data processing network. The system, in some embodiments, uses in-flight tables for storing status information about the work flow at the various sites, and in that way, monitors the work flow. The system can also use an active-synchronization among the different processing sites to maintain status of the work as well as, in some embodiments, to recover work that has been completed in the case of a system outage or processing issue. The system operates at the work level (i.e., at the work item level) rather than the batch (or project) level and processes work at the smallest data block level allowed by the various nodes within the network, thereby ensuring maximum recovery in the event of an outage.

Referring now to FIG. 7, a flowchart illustrates a method 700 for distributed data processing according to embodiments of the invention. The first step, as represented by block 702 is to access a master queue of data processing work. The data processing work may include a plurality of data processing jobs stored in a long term memory cache. The next step, as represented by block 704, is to select at least one of the plurality of data processing jobs from the master queue of data processing work. Next, as represented by block 706, the system divides the at least one data processing job into a plurality of data processing items. For example, a data processing job may include five items. Finally, as represented by block 708, the system allocates each of the plurality of data processing items to a different user system within a distributed network of user systems. The system may dynamically allocate and/or re-allocate the items in order to maximize efficiency in processing the job. For example, the system may determine a work capacity for each user system and allocate or re-allocate the items based on the determined work capacities.

Referring now to FIG. 8, a flowchart illustrates a method 800 for using in-flight tables for maximizing processing efficiency according to embodiments of the invention. The first step, as represented by block 802 is to store the data processing jobs in one or more in-flight data tables. The next step, represented by block 804, is to monitor the in-flight data table to ensure efficient data processing of the data processing job. Next, in some embodiments, the next step, or a step that occurs at different stages in the various processes described herein, is to actively synchronize some or all the plurality of data processing items among the user systems, as represented by block 806.

Referring now to FIG. 9, a flowchart illustrates a method 900 for synchronizing and recovering data processing according to embodiments of the invention. The first step, as represented by block 902, is to repeatedly or periodically save a status of progress of data processing. In some embodiments, as represented by block 904, the next step is to repeatedly or periodically save results of the data processing. For example, the results may be saved on the distributed network of user systems. Next, as represented by block 906, the system, in some embodiments, processes each of the items at the smallest block level allowed by each of the distributed user systems. Doing so may maximize efficiency of automatic recovery of completed data processing work. Finally, in some embodiments, the system can automatically recover, in response to a processing fault by one of the user systems, completed data processing work using the saved results of the data processing, as represented by block 908.

System for Distributed Data Processing with Automatic Caching at Various System Levels According to embodiments of the invention, a system enables distributed allocation of work to multiple computing systems with multi-level data caching, thereby maximizing efficiency of processing of work and reallocation of work. The system pushes work to operators (at user systems) and maintains the multi-level caching structure to ensure accurate recovery and minimize latency. In some cases, the system determines the priorities of various work projects and stores them using an in-flight table. It pushes work into a queue at an interface layer that may also include an interface layer memory cache for storing the work. In various embodiments, the system may manage several layers of queuing and/or caching in order to minimize latency to a user system or automatic processing system. That is, when a user system is ready for additional work, then the work may be provided to the user at a near-real-time rate. In some embodiments, the cache (at one or more of the layers) may be distributed over a cluster of servers using a caching algorithm. A user system may retrieve an amount of work into a browser on the user system for processing. If the user is delayed or takes a break from the user system, the system may return the unfinished work to the interface layer for re-caching and redistribution to a new user system. The system may also have a monitoring capability configured to monitor the cache at each level in order to ensure maximum efficiency in work transfer from layer to layer and to and from user systems.

Referring now to FIG. 10, a flowchart illustrates a method 1000 for distributed data processing with automatic caching at multiple system levels according to embodiments of the invention. First, as represented by block 1002, the system accesses a master queue of data processing work. This data processing work may include data processing jobs stored in a long term memory cache. Next, as represented by block 1004, the system selects at least one of the data processing jobs from the master queue of data processing work. The system then pushes the selected data processing jobs to an interface layer, as represented by block 1006. For example, the system may access the jobs from the long term memory cache and save them in the interface layer cache. Lastly, as represented by block 1008, the system may push jobs to a memory cache of a first user system. This push may be configured such that the new work is pushed prior to the user completing the previous job. This timing may provide that the user does not experience any "downtime" where the user system does not have new work for the user to perform. Once the previous work is complete, the user system may push that completed work back to the interface layer.

Referring now to FIG. 11, a flowchart illustrates a method 1100 for selecting and pushing data processing jobs using in-flight data tables according to embodiments of the invention. First, as represented by block 1102, the system determines which of the plurality of data processing jobs are high priority (and low priority, thereby prioritizing them). Next, as represented by block 1104, the system stores those data processing jobs of high priority in an in-flight data table. Finally, the system may push the selected data processing jobs to the interface layer from the in-flight data table based on their relative priorities, as represented by block 1106.

Referring now to FIG. 12, a flowchart illustrates a method 1200 for reallocating jobs according to embodiments of the invention. First, as represented by block 1202, the system may receive, from a first user system, some or all the data processing jobs that had previously been pushed to the first user system. In some cases, the user system may have determined that the user has left the user system and, therefore, the job should be processed by another user. Next, as represented by block 1204, the system may re-store the received data processing jobs in the interface layer cache. Finally, as represented by block 1206, the system pushes the re-stored data processing jobs from the interface layer cache to a memory cache of a second user system.

Referring now to FIG. 13, a flowchart illustrates a method 1300 for adjusting caches and allocating jobs according to embodiments of the invention. The first step, as represented by block 1302, is to determine that the first user system is ready for processing. In some cases, the user system may be almost ready for processing. For example, the user system may run an algorithm that predicts how long until the user will be ready for more work, and when that time reaches a predetermined threshold, the user system communicates with the interface layer that the user system is ready for more work. The next step, as represented by block 1304, is to allocate at least a portion of the data processing jobs to the first user system.

The next step, as represented by block 1306, is to monitor the interface layer cache. This is an ongoing step that may be occurring constantly, regularly or periodically. Additionally, or alternatively, the other cache(s) may be monitored also. The next step, as represented by block 1308, is to determine whether more or less data processing jobs should be moved from the long term memory cache to the interface layer memory cache in a given time period. Finally, as represented by block 1310, the system implements the appropriate movement based on the determination.

In some embodiments, the system provides access to selected data processing jobs in the interface layer and one or more user systems can request or pull the data processing jobs as they are needed (or soon before they are needed as discussed above). In cases where the user systems request the jobs, then the interface layer may push a job that is specifically requested by the use system or may select the next highest priority job to push to the user system if the user system request is not specific to a job.

In some embodiments, the interface layer memory cache includes a network of clustered servers running a caching algorithm. The caching algorithm may be configured to minimize latency of access to the stored data processing jobs by the user systems according to the methods discussed herein.

FIG. 14 illustrates a data flow for distributed data processing with our recovery 1400, in accordance with an embodiment of the invention. In some embodiments, the data processing jobs stored in the block 1402 are retrieved by a network of independent processing nodes to be load balanced across all available processing capacity and compensate for node failure by implementing data redundancy. In this regard, the present invention divides a data processing job into one or more work items and distributors the work items between multiple sites (e.g. nodes) for processing. In addition, the system may be configured to monitor the workflow at the lowest level (e.g. work item level) allowed at each node. In some embodiments, to maintain load-balancing, the system may be configured to implement a poller 1404 to track and count the number of data processing jobs to be assigned to a particular user (e.g. node). In this regard, the poller 1404 limits the number of messages that can be transmitted to be stored in the in-flight queue 1406. The in-flight queue 1406 is capable of retrieving data processing jobs and storing these jobs according to one or more conditions implemented by the system. These conditions include but are not limited to, a priority assigned to each data processing job retrieved from data processing jobs database 1402, an amount of time that a data processing job has been queued in the in-flight queue 1406, an amount of time associated with the processing of the data processing job, or the like.

Once the in-flight queue 1406 is populated, the system may be configured to retrieve information associated with the data processing job, such as metadata that is needed for keying information associated with a data processing job. In response, the system may then store the data processing job and the metadata retrieved in a shared in-flight queue 1408. This shared in-flight queue 1408 may be configured to temporarily store data processing job before being placed in a shared queue 1410. The data processing job and the metadata associated with the data processing job is stored in the shared in-flight queue 1408 based on one or more similar conditions implemented by the system in the in-flight queue 1406. In this regard, the shared in-flight queue 1408 may be repopulated at any time if any of the conditions are violated.

Once the data is placed in the shared queue 1410, the system may then be configured to retrieve images associated with a data processing job from the network access storage 1414 and store the data processing job, the metadata, and the image associated with the data processing job in a shared user queue 1412. This information is then placed in a team queue 1418 to enable the user to receive keying work. Further, this information is also placed in the cache 1416 such that the latency involved in retrieving data from a long-term storage, such as, a network access storage, is reduced. In this way, the system may be configured to improve the processing speed associated with providing the data processing job to the user. Once the user has completed processor previous job, the system may receive a request to provide another data processing job to the user. In response, the system may be configured to retrieve the data processing job, the metadata associated with a data processing job, and the image associated with a data processing job from the cache 1416 and presented to the user via the user session 1420.

FIG. 15 an overview of the system for distributed data processing with recovery options 1500, in accordance with an embodiment of the invention. As shown in FIG. 15, the overview of the system shows a front end 1502 and a back end 1504. The front end of the system 1502 shows exemplary processing nodes, node 1 and node 2. Typically, both node 1 and node 2 are part of the data processing network capable of bidirectional communication and replication. In addition, by load-balancing the workload, the system distributes workloads across both the nodes to prevent any one single node from getting overloaded. In this regard, the data transmitted to each node is replicated in every other node is a contingency to ensure data retrieval in case of failure. Accordingly, at the back end 1504, the system includes an image of each node to be stored under every processing node. This is shown in FIG. 1500 where an image of node 2 is stored under node 1, and an image of node 1 is stored under node 2. In some embodiments, storing the image of the node includes executing a dual write instruction to store the information associated with the node 1 into the memory of node 2 and the information associated with the node 2 into the memory of node 1. In some embodiments, the system may also determine whether there is any missing information in any of the nodes and resolves the discrepancy accordingly.

As will be appreciated by one of ordinary skill in the art, the present invention may be embodied as an apparatus (including, for example, a system, a machine, a device, a computer program product, and/or the like), as a method (including, for example, a business process, a computer-implemented process, and/or the like), or as any combination of the foregoing. Accordingly, embodiments of the present invention may take the form of an entirely software embodiment (including firmware, resident software, microcode, or the like), an entirely hardware embodiment, or an embodiment combining software and hardware aspects that may generally be referred to herein as a "system." Furthermore, embodiments of the present invention may take the form of a computer program product that includes a computer-readable storage medium having computer-executable program code portions stored therein. As used herein, a processor may be "configured to" perform a certain function in a verity of ways, including, for example, by having one or more general-purpose circuits perform the functions by executing one or more computer-executable program code portions embodied in a computer-readable medium, and/or having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, infrared, electromagnetic, and/or semiconductor system, apparatus, and/or device. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as a propagation signal including computer-executable program code portions embodied therein.

It will also be understood that one or more computer-executable program code portions for carrying out operations of the present invention may include object-oriented, scripted, and/or unscripted programming languages, such as, for example, Java, Perl, Smalltalk, C++, SAS, SQL, Python, Objective C, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F#.

It will further be understood that some embodiments of the present invention are described herein with reference to flowchart illustrations and/or block diagrams of systems, methods, and/or computer program products. It will be understood that each block included in the flowchart illustrations and/or block diagrams, and combinations of blocks included in the flowchart illustrations and/or block diagrams, may be implemented by one or more computer-executable program code portions. These one or more computer-executable program code portions may be provided to a processor of a general purpose computer, special purpose computer, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

It will also be understood that the one or more computer-executable program code portions may be stored in a transitory or non-transitory computer-readable medium (e.g., a memory, or the like) that can direct a computer and/or other programmable data processing apparatus to function in a particular manner, such that the computer-executable program code portions stored in the computer-readable medium produce an article of manufacture including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with operator and/or human-implemented steps in order to carry out an embodiment of the present invention.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A data processing system for distributed data processing, the data processing system comprising:
    a memory device with computer-readable program code stored thereon;
    a communication device;
    a processing device operatively coupled to the memory device and the communication device, wherein the processing device is configured to execute the computer-readable program code to:
        access a master queue of data processing work comprising a plurality of data processing jobs stored in a long term memory cache;
        select at least one of the plurality of data processing jobs from the master queue of data processing work;
        divide the at least one data processing job into a plurality of data processing items;
        allocate each of the plurality of data processing items to a different one of a distributed network comprising a plurality of distributed user systems to ensure maximum efficiency in processing the at least one data processing job;
        actively synchronize some or all the plurality of data processing items among the plurality of distributed user systems, the actively synchronizing comprising:
            repeatedly or periodically saving results of the data processing; and
            processing the data processing items at a smallest block level allowed by each of the distributed user systems, thereby maximizing efficiency of automatic recovery of completed data processing work.

2. The data processing system of claim 1, wherein the processing device is further configured to execute computer-readable code to:
    store the data processing jobs in an in-flight data table; and
    monitor the in-flight data table to ensure efficient data processing of the data processing job.

3. The data processing system of claim 1, wherein actively synchronizing the data processing items comprises repeatedly or periodically saving a status of progress of data processing.

4. The data processing system of claim 1, wherein the processing device is further configured to execute computer-readable code to:
    automatically recover, in response to a processing fault by one of the user systems, completed data processing work using the saved results of the data processing.

5. The data processing system of claim 1, wherein the repeated or periodic saving of results of the data processing comprises saving some or all the results on the distributed network of user systems.

6. The data processing system of claim 1, wherein the processing device is further configured to execute computer-readable code to:
    determine a work capacity for each of the user systems on the distributed network; and
    wherein allocating is based on the determined work capacity for each of the user systems.

7. A computer program product for distributed data processing, the computer program product comprising at least one non-transitory computer-readable medium having computer-readable program code portions embodied therein, the computer-readable program code portions comprising:
    an executable portion configured for accessing a master queue of data processing work comprising a plurality of data processing jobs stored in a long term memory cache;
    an executable portion configured for selecting at least one of the plurality of data processing jobs from the master queue of data processing work;
    an executable portion configured for dividing the at least one data processing job into a plurality of data processing items;
    an executable portion configured for allocating each of the plurality of data processing items to a different one of a distributed network comprising a plurality of distributed user systems to ensure maximum efficiency in processing the at least one data processing job;
    an executable portion configured for actively synchronizing some or all the plurality of data processing items among the plurality of distributed user systems, the actively synchronizing comprising:
        repeatedly or periodically saving results of the data processing; and processing the data processing items at a smallest block level allowed by each of the distributed user systems, thereby maximizing efficiency of automatic recovery of completed data processing work.

8. The computer program product of claim 7, wherein the computer-readable program code portions further comprise:
an executable portion configured for storing the data processing jobs in an in-flight data table; and
an executable portion configured for monitoring the in-flight data table to ensure efficient data processing of the data processing job.

9. The computer program product of claim 7, wherein actively synchronizing the data processing items comprises repeatedly or periodically saving a status of progress of data processing.

10. The computer program product of claim 7, wherein the computer-readable program code portions further comprise:
an executable portion configured for automatically recovering, in response to a processing fault by one of the user systems, completed data processing work using the saved results of the data processing.

11. The computer program product of claim 7, wherein the repeated or periodic saving of results of the data processing comprises saving some or all the results on the distributed network of user systems.

12. The computer program product of claim 7, wherein the computer-readable program code portions further comprise:
an executable portion configured for determining a work capacity for each of the user systems on the distributed network; and
wherein allocating is based on the determined work capacity for each of the user systems.

13. A computer-implemented method for distributed data processing, the method comprising:
accessing a master queue of data processing work comprising a plurality of data processing jobs stored in a long term memory cache;
selecting at least one of the plurality of data processing jobs from the master queue of data processing work;
dividing the at least one data processing job into a plurality of data processing items;
allocating each of the plurality of data processing items to a different one of a distributed network comprising a plurality of distributed user systems to ensure maximum efficiency in processing the at least one data processing job; and
actively synchronizing some or all the plurality of data processing items among the plurality of distributed user systems, the actively synchronizing comprising:
repeatedly or periodically saving results of the data processing; and
processing the data processing items at a smallest block level allowed by each of the distributed user systems, thereby maximizing efficiency of automatic recovery of completed data processing work.

14. The method of claim 13, further comprising:
storing the data processing jobs in an in-flight data table; and
monitoring the in-flight data table to ensure efficient data processing of the data processing job.

* * * * *